United States Patent Office 2,957,931
Patented Oct. 25, 1960

2,957,931

SYNTHESIS OF COMPOUNDS HAVING A CARBON-PHOSPHORUS LINKAGE

Lyle A. Hamilton and Robert H. Williams, Pitman, N.J., assignors to Socony Mobil Oil Company, Inc., a corporation of New York No Drawing. Filed July 28, 1949, Ser. No. 107,376

11 Claims. (Cl. 260—403)

This invention relates, broadly, to organic phosphorus compounds, and is more particularly concerned with organic phosphorus compounds in which at least one organic radical is joined to phosphorus by a direct carbon-phosphorus linkage and with a process for producing them.

As is well known to those familiar with the art, there has been considerable confusion in the nomenclature of organic phosphorus compounds, particularly the acid and ester types. For example the names, "phosphonous acid" and "phosphinous acid," have been suggested by the American Chemical Society. These terms, however, denote compounds which may exist in isomeric forms and the terms do not distinguish these forms. Accordingly, for the sake of clarity and of complete understanding of the present invention, and in order to indicate actual structural forms, the following system of phosphorus compound nomenclature has been selected, and adhered to throughout the specification and claims: In general, all compounds are named as derivatives of phosphine or of phosphine oxide, except in the cases of esters of inorganic phosphorus acids and of phosphinic and phosphonic acids and their derivatives. In using this system, the name of an ester radical is written as a separate word from the name of the acid nucleus. The name of a radical which is attached directly to phosphorus, thereby forming part of the acid nucleus, is written as one word with the name of the acid. The possible inorganic phosphorus compounds are illustrated in the following formulae and equations:

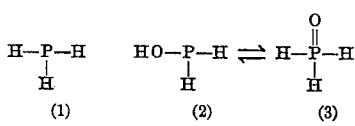

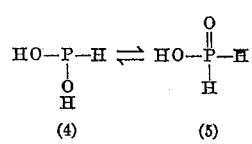

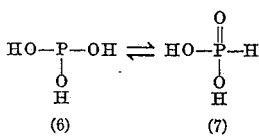

Formula 1 represents phosphine. Compounds having Formulae 2 and 3 are not known in the inorganic series, but only with organic substituents. Formula 5 represents hypophosphorous acid, whereas Formula 4 represents an isomeric form known only in the organic series. The compound having Formula 7 is orthophosphorous acid, but the isomeric form, Formula 6, is known only in the organic series.

Esters of the inorganic acids, orthophosphorous acid (7) and hypophosphorous acid (5), are named as phosphites and hypophosphites, e.g., monoethyl phosphite, diethyl phosphite, and ethyl hypophosphite.

Organic phosphines having groups such as R, RO, RS, etc., in place of the hydrogen atoms of phosphine, and the monosubstituted phosphine oxides are named in accordance with the I.V.C. Rule 34a, c, and f [see C.A. 39, 5939–5940 (1945)].

When two hydrogen atoms of phosphine oxide are replaced with organic radicals, there are two possible isomeric forms, in accordance with the equation, illustrated by the ethyl derivative,

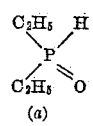

(a)

or

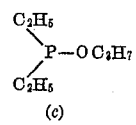

(b)

To both of these isomers has been applied the apparently misleading term "phosphinous acid." The "ester" of form (b) also can exist in an isomeric form,

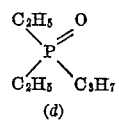

(c)

or (d)

In order to avoid ambiguity, all of these compounds are named as derivatives of phosphine or of phosphine oxide. Accordingly, form (a) is diethylphosphine oxide; form (b), hydroxydiethylphosphine; form (c), propoxydiethylphosphine; and form (d), propyldiethylphosphine oxide.

When only one of the hydrogen atoms attached to the phosphorus atom of hypophosphorous acid (5) is replaced with an organic radical two isomeric forms are obtained,

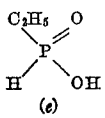
(e)

or

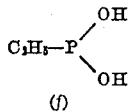
(f)

The single term, "phosphonous acid," has been applied to both isomers. Likewise, the "esters" thereof have two isomeric forms,

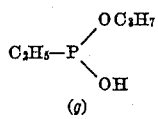
(g)

or

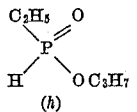
(h)

Accordingly, these compounds are all named as derivatives of phosphine and of phosphine oxide. Thus, form (e) is hydroxyethylphosphine oxide; form (f), ethyldihydroxyphosphine; form (g), hydroxypropoxyethylphosphine; and form (h), ethylpropoxyphosphine oxide.

The acid resulting from replacing both of the hydrogen atoms attached to the phosphorus atom of hypophosphorous acid (5) with organic radicals is named as a phosphinic acid. The esters thereof are called phosphinates, e.g., propyl diethylphosphinate.

Organic compounds, in which the hydrogen atom attached to the phosphorus atom of orthophosphorous acid (7) is replaced with an organic radical, are called phosphonic acids. The nomenclature of phosphinic acids and phosphonic acids has been described by the I.V.C. Rule 34b and c [C.A. 39, 5939 (1945)].

Phosphorus compounds which contain more complex substituent groups are named in accordance with the nomenclature described hereinbefore. The substituent groups are designated by their usual radical names, such as silicyl (H₃Si—), stannyl (H₃Sn—), amido (H₂N—), sulfo (HO(O)SO—), sulfino (HO(O)S—), phosphono (HO)₂OP—), phosphino (H₂P—), phosphonico (HOOP—), phospharseno (—P:As—), phosphazo (—P:N—), phospho (O₂P—), phosphoro (—P:P—), phosphoroso (OP—), phosphinous (HOP—), etc. The phosphorus compounds which contain two or more phosphorus-containing groups attached to a hydrocarbon group or to a substituted hydrocarbon group are designated as substituted derivatives thereof. For example,

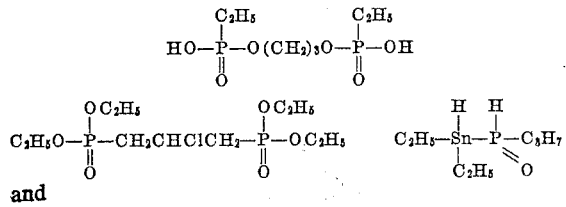

and are called, respectively, bis-(ethanephosphinicooxy-)propane, bis-(diethyl phosphono-)2-chloro-propane, (diethylstannyl-)propylphosphine oxide, and (diethylphosphino-)propylphosphine. In a similar manner, compounds derived by the addition of a phosphorus compound reactant to a more complex unsaturated compound reactant, such as unsaturated acids, esters, alcohols, aldehydes, etc. are named as substituted derivatives of the unsaturated compound, utilizing the radical names set forth hereinbefore. For example,

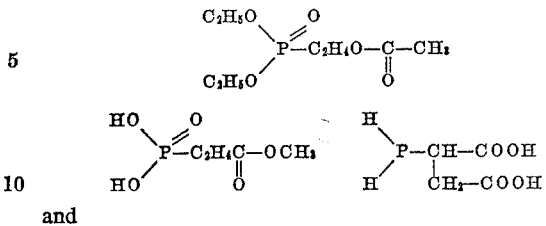

and

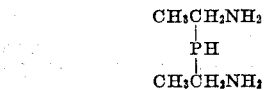

are named (diethyl phosphono-)ethyl acetate, methyl phosphonopropionate, phosphinosuccinic acid, and ethyl phosphinopropanol, respectively.

However, when two or more of the more complex unsaturated compounds are added to the same phosphorus compound, nomenclature becomes more difficult. Accordingly, the products produced are named as substituted derivatives of the phosphorus compound reactant, setting forth in parenthesis the name of the more complex compound component. For example, the products of the following reactions:

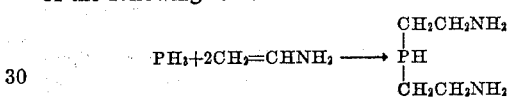

or $$PH_3 \quad \begin{array}{c} CH_3CH_2NH_2 \\ | \\ PH \\ | \\ CH_3CH_2NH_2 \end{array}$$

and:

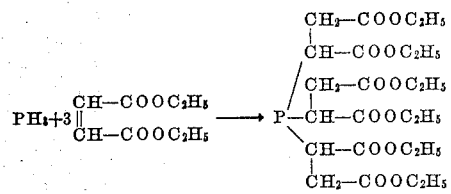

are named, respectively, bis-(ethylamine-)phosphine and tris-(diethyl succinate-)phosphine.

It must be appreciated that the foregoing examples are merely illustrative of the nomenclature system used herein. Methyl, ethyl, and propyl radicals have been used for the purposes of illustration. When other radicals appear in a compound in place of the ethyl and/or propyl radicals, the standard name of the radical so appearing will be used in the compound name. The foregoing system of nomenclature is believed to cover most phosphorus compounds encountered. Whenever instances occur in which a compound cannot be named adequately by this system of nomenclature, the nomenclature thereof will be explained when a name is assigned to the compound.

The compounds contemplated herein include phosphines, phosphine oxides, phosphonic acids, esters of phosphonic acids, phosphinic acids, esters of phosphinic acids, and various substituted derivatives of these compounds. Some of the compounds which can be prepared by the present process are known, such as, for example, dibutyl esters of normal 1-alkanephosphonic acids. A large variety of compounds, however, are believed to be new compositions of matter. The latter include esters of normal- and branched-chain alkanephosphonic acids having the phosphorus attached to a carbon atom other than a terminal carbon atom in the chain; derivatives of alkanephosphonic acids in which additional functional groups are carried on the carbon structure, such as carboxylic acid groups, aldehyde groups, carbonyl groups, hydroxyl groups, halogens, amino or amido groups, or sulfide groups; olefinic and acetylenic phosphonic acids and their derivatives; and telomers containing phosphorus. Many other new compositions contemplated herein will become apparent hereinafter.

The prior art methods of preparing organic phosphorus compounds have been disadvantageous from one or more standpoints. They have been relatively expensive, and/or the reactions involved therein have been difficult to control, and/or they have given poor yields in many instances, and/or they have been rather complex and involved. Furthermore, it has been impossible to prepare many of the compounds contemplated herein, by the use of known reactions. Insofar as is now known, the addition of phosphorus compounds having at least one phosphorus-hydrogen linkage to unsaturated carbon-carbon linkages, i.e., olefinic and acetylinic linkages, has never been described in the literature.

It has now been found that organic phosphorus compounds having at least one carbon-phosphorus linkage per molecule can be prepared by a process which is simple and commercially feasible. It has now been discovered that organic phosphorus compounds having at least one carbon-phosphorus linkage per molecule can be prepared by the reaction of phosphorus compounds having at least one phosphorus-hydrogen linkage per molecule with organic compounds having at least one unsaturated carbon-carbon linkage per molecule.

Accordingly, it is a broad object of the present invention to provide a process for preparing organic phosphorus compounds which is simple and commercially feasible. Another object is to provide a novel process for the preparation of organic phosphorus compounds. A more specific object is to provide a process for the preparation of organic phosphorus compounds having at least one carbon-phosphorus linkage per molecule, which comprises reacting phosphorus compounds having at least one phosphorus-hydrogen linkage per molecule with organic compounds having at least one unsaturated carbon-carbon linkage per molecule. An important object is to provide new organic phosphorus compounds, including polymeric compounds and telomers, having at least one carbon-phosphorus linkage per molecule. Other objects and advantages of the present invention will become obvious to those skilled in the art from the following detailed description.

Broadly stated, the present invention provides organic phosphorus compounds having at least one carbon-phosphorus linkage per molecule, and a process for producing the same, which comprises reacting a phosphorus compound having at least one phosphorus-hydrogen linkage per molecule with an organic compound having at least one unsaturated carbon-carbon linkage per molecule, at temperatures varying between about 20° C. and about 300° C.

In general, any compound of phosphorus having at least one phosphorus-hydrogen linkage per molecule, i.e., having at least one hydrogen atom directly attached to phosphorus, is a suitable reactant for the purposes of the present invention. As is well known to those skilled in the art, phosphorus belongs to Group VA of the periodic chart of the elements, as set forth in "Introductory College Chemistry" by H. G. Deming, and has five electrons in its outer orbit. Accordingly, most of the compounds of phosphorus belong to one of two classes, namely, Type I, those wherein three atoms have formed covalent shared electron bonds with phosphorus and the phosphorus has an extra unshared pair of electrons, and Type II, those in which in addition to the three covalent linkages, the unshared electron pair of the phosphrous has accepted another atom and formed a coordinate covalent bond therewith. Generally speaking, compounds of Type II are the more stable compounds, and where a compound can exist as either one of Type I or Type II, the latter form will predominate.

The two types of phosphorus compounds are represented by the following formulae:

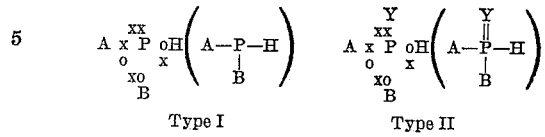

Type I          Type II wherein A and B are monvalent atoms or radicals and Y is any atom or radical attached to phosphorus by coordinate covalence. Small $x$ represents electrons contributed by the phosphorus atom and small $o$ represents electrons contributed by A, B, and H. Y can be an atom of group VIA of the periodic chart, i.e., an oxygen, sulfur, selenium, or tellurium atom, or it can be a radical formed by an atom of an element in group IIIA to which are attached three monovalent atoms or radicals, such as, for example, boron hydride ($BH_3$), trimethyl boron [$B(CH_3)_3$], boron chloride ($BCl_3$), aluminum chloride ($AlCl_3$), or a similar molecule capable of sharing the electron pair of phosphorus.

Broadly speaking, A and B in the phosphorus compound reactant can be hydrogen atoms, hydrocarbon radicals, hydrogen atoms and/or hydrocarbon radicals linked to the phosphorus through an atom of an element in group VIA of the periodic chart, or more complex monovalent radicals, e.g., H—, HO—, R—, RO—, HS—, RS—, RSO—, $RSO_2$—, $H_2N$—, RHN—, $R_2N$—, HSe—, RSe—, HTe—, RTe—, RO(O)HPR—, HO(O)-HPR—, HO(O)HPORO—, HO(O)HPSRS—, $H_3Si$—, $Cl_3Si$—, (RO)$Cl_2Si$—, $(RO)_2ClSi$—, $RO_3Si$—, (RS)-$Cl_2Si$—, $(RS)_2ClSi$—, $(RS)_3Si$—, $RCl_2Si$—, $R_2ClSi$—, $R_3Si$—, $R_3Ge$—, $R_2P$—, $H_2PR$—, $R_2PR$—, $H_2POR$—, $(RO)_2(O)PR$—, $(HO)_2(O)PORO$—, Cl—, F—, Br—, I—, and the like, wherein R is a hydrocarbon radical or a heterocyclic radical. Also, one or more of the hydrogen atoms of the hydrocarbon radical can be replaced with the aforementioned groups or with groups such as nitrile groups, nitro groups, carboxyl groups and esters and amides thereof, or carbonyl groups.

It is appreciated that some of the groups enumerated in the previous paragraph will react with olefins by means of a free radical mechanism. In these cases, there may be a competitive reaction with the reaction of the present invention. However, conditions can be adjusted so that the addition to phosphorus will predominate. In some cases it may be desirable to add olefin reactants to both the substituent group and the substituted phosphorus compond reactant, and this can also be done. Regardless of the conditions chosen, however, there will be some addition in accordance with the reaction involved in the present invention, and accordingly, the aforementioned groups are included within the broad scope of the invention contemplated herein. Preferably, the phosphorus compound reactant is of the type wherein A and B are H—, HO—, R—, or RO—, wherein R is as set forth hereinbefore, and Y is nothing (Type I) or oxygen (Type II).

In connection with the preferred class of phosphorus compound reactants, it is to be noted that, when A and/or B in compounds of Type I are hydroxyl groups, the compounds will isomerize to form compounds of Type II. Examples of the possible inorganic forms of the preferred phosphorus compound reactants have been set forth hereinbefore in Formulae 1 through 7. All of these types, with the exception of type (6), are suitable for use in the present process. However, as mentioned hereinbefore, types (1), (5) and (7) are the only ones known in the inorganic series. These materials and their metal salts are utilizable, as are compounds of these types in which one or more of the hydrogen atoms are replaced with organic radicals, as set forth hereinbefore. In all cases, however, at least one hydrogen attached to phosphorus must be left unsubstituted.

The compounds of the organic series corresponding to compounds (1) through (7) ultilizable herein are:

(In order to illustrate the nomenclature system further, each compound has been named, assuming that R is a butyl group.)

| Inorganic For | Organic Form | | | |
|---|---|---|---|---|
| (1) H—P—H<br>$\|$<br>H<br><br>Phosphine | (1a) R—P—H<br>$\|$<br>H<br><br>Butyl-<br>phosphine | (1b) R—P—H<br>$\|$<br>R<br><br>Dibutyl-<br>phosphine | | |
| (2) HO—P—H<br>$\|$<br>H | (2a) RO—P—H<br>$\|$<br>H<br><br>Butoxy-<br>phosphine | (2b) RO—P—H<br>$\|$<br>R<br><br>Butoxybutyl-<br>phosphine | (2c) HO—P—H<br>$\|$<br>R<br><br>Hydroxybutyl-<br>phosphine | |
| | | ⇅ | | |
| (3) H—P(=O)—H<br>$\|$<br>H | (3a) R—P(=O)—H<br>$\|$<br>R<br><br>Dibutyl-<br>phosphine<br>oxide | | (3b) H—P(=O)—H<br>$\|$<br>R<br><br>Butyl-<br>phosphine<br>oxide | |
| (4) HO—P—H<br>$\|$<br>O<br>$\|$<br>H | (4a) RO—P—H<br>$\|$<br>O<br>$\|$<br>R<br><br>Dibutoxy<br>phosphine | (4b) RO—P—H<br>$\|$<br>O<br>$\|$<br>H<br><br>Hydroxybutoxy-<br>phosphine | | |
| | | ⇅ | | |
| (5) HO—P(=O)—H<br>$\|$<br>H<br><br>Hypophosphorous<br>acid | (5a) RO—P(=O)—H<br>$\|$<br>R<br><br>Butylbutoxy-<br>phosphine<br>oxide | (5b) RO—P(=O)—H<br>$\|$<br>H<br><br>Butylhypo-<br>phosphite<br>oxide | (5c) HO—P(=O)—H<br>$\|$<br>R<br><br>Butylhydroxy-<br>phosphine | |
| (6) HO—P—OH<br>$\|$<br>O<br>$\|$<br>H | (6a) RO—P—OH<br>$\|$<br>O<br>$\|$<br>H<br><br>Dihydroxybutoxy-<br>phosphine | (6b) RO—P—OH<br>$\|$<br>O<br>$\|$<br>R<br><br>Dibutoxyhydroxy-<br>phosphine | | |
| | ⇅ | ⇅ | | |
| (7) HO—P(=O)—H<br>$\|$<br>O<br>$\|$<br>H<br><br>Orthophosphorous<br>acid | (7a) RO—P(=O)—H<br>$\|$<br>O<br>$\|$<br>H<br><br>Monobutyl<br>phosphite | (7b) RO—P(=O)—H<br>$\|$<br>O<br>$\|$<br>R<br><br>Dibutyl<br>phosphite | | |

A number of the formulae shown represent compounds which either do not exist or are relatively unstable. In these cases, the formulae for the isomeric forms are connected by arrows, with the larger arrow in each case pointing to the stable form. Since in all cases, except in the case of Formulae 6a and 6b both products are suitable for use in the present invention, the question as to which isomer exists in fact is purely an academic one. As mentioned hereinbefore, materials having the Formulae 6, 6a, and 6b are not suitable for use in the present process. However, no evidence has been found for the existence of more than minute amounts, in the range of less than one percent, of these components in admixture with the major components having Formulae 7a and 7b. These compounds have been included in the foregoing list to show that products made from materials which could possibly have the Formula 6a or 6b will isomerize to compounds having the Formula 7a or 7b, and, accordingly, they will be suitable for use in the present invention.

In the foregoing Formulae 1a through 7b, R can be any hydrocarbon radical such as branched-chain or straight-chain aliphatic, cycloaliphatic, aryl, alkaryl, and aralkyl radicals. Non-limiting examples are methyl; ethyl; propyl; isopropyl; butyl; amyl; t-amyl; hexyl, heptyl; 2-ethylhexyl; octyl; nonyl; 2,5-dimethylheptyl; decyl; undecyl; dodecyl; 2,4,5,7-tetramethyloctyl; tridecyl; tetradecyl; pentadecyl; hexadecyl; 4,7-dipropyldecyl; 3,12-diethyltetradecyl; heptadecyl; octadecyl; eicosyl; 3-ethyloctadecyl; pentacosyl; 7-hexyldocosyl; triacontyl; isotriacontyl; vinyl; allyl; crotyl; 3-hexenyl; 4-methyl-1-heptenyl; 2-isopropyl-1-hexenyl; 2-octenyl; 4-octenyl; 2-methyl-3-ethyl-2-heptenyl; 6-dodecyl; 8-propylpentadecenyl; 1-tetracosenyl; 9-octyl-8-heptadecenyl; 2-triacontenyl; octadecenyl; propadienyl; 1,2-butadienyl; 3-methyl-1,2-butadienyl; 2,4-hexadienyl; 2-ethyl-1,3-butadienyl; 2-methyl-1,5-hexadienyl; 1,4-octadienyl; 1,11-dodecadienyl; 2,6-dimethyl-2,6-decadienyl; 1,17-octadienyl; 2-methyl-2,14-tricosadienyl; 1,3,5-hexatrienyl; 7-methyl-1,3,7-nonatrienyl; 2,6-dimethyl-1,5,8-undecatrienyl; 3-methylpentynyl; 6,9-dimethyl-5,9-tetradecadien-7-ynyl; cyclopropyl; methylcyclopropyl; dimethylcyclopropyl; cyclobutyl; cyclopentyl; methylcyclopentyl; cyclohexyl; methylcyclohexyl; dimethylcyclohexyl; trimethylcyclohexyl; cyclobutenyl; methylcyclobutenyl; cyclopentenyl; trimethylcyclopentenyl; cyclohexenyl; methylcyclohexenyl; cyclopentadienyl; cyclohexadienyl; cyclodotriacontyl; phenylacetylenyl; 1,2-diethynylphenyl; 1-phenyl-1,3-butadienyl; 1,3-divinylphenyl; 1-methyl-4-ethynylbenzyl; 3-methyl-2-phenyl-2-pentenyl; 5-phenyl-5-docosenyl; 2-cyclopropyl-2-butenyl; vinylidene cyclohexyl; 1-cyclohexyl-2,3-pentadienyl; 2,4 - dimethyl-4-cyclohexyl-2-pentenyl; 1,16-cyclotriacontadienyl; bicyclohexyl; indenyl; phenylcyclopropyl; tetralinyl; dicyclopentadienyl; α-pinenyl; isocamphyl; fenchyl; thujyl; phenylcyclohexyl; 1,2,7-trimethylnaphthyl; cycloctylcyclooctyl; 1,1-dicyclohexyldodecyl; 1-cyclohexyl-2-(cyclohexylmethyl)-pentadecyl; abietyl; hydroabietyl; phenyl; tolyl; xylyl; benzyl; amylphenyl; wax phenyl; kerosene alkylphenyl; naphthenyl; alkylated naphthenyl; and biphenyl radicals, and isomers of the foregoing radicals. Heterocyclic radicals are also suitable. Thienyl, octylthienyl, pyridyl, thenyl, quinolyl, pyrryl, piperidyl, furyl, indolyl, furoyl, and furfuryl radicals may be mentioned by way of non-limiting examples. The radical, R, can contain substituent groups therein, such as thio groups, hydroxyl groups, halogen atoms, carboxyl radicals, nitro groups, etc. Non-limiting examples of these substituted radicals are chlorophenyl; 2,2-chlorobromoethyl; 3-chloro-3-carboxyl-2-propenyl; chlorodinitrophenyl; dimethoxyphenyl; ethoxylacetyl; phenylcarbonyl; fluoroacetyl; glyceryl; heptadecoxy; hydroxybenzoxy; cinnamyl; stearoyl; linoyl; nitrosotolyl; heptachloropropyl; nitroacenophthenyl; iodophenoxy; butyroxy; iodosophenyl; benzylthio; thiocresyl; methoxythiocresyl; methylthioheptyl; benzenesulfonyl; acetamido; N-decyldodecamido; succinimido; and 5-(isopropylcarboxylate)-heptyl radicals, and isomers and homologs thereof.

Non-limiting examples of the phosphorus compound reactant are methylphosphine;
hexylphosphine;
triacontylphosphine;
vinylphosphine;
octadecenylphosphine;
cyclopropylphosphine;
trimethylcyclohexylphosphine;
cyclobutenylphosphine;
phenylphosphine;
naphthylphosphine;
thienylphosphine;
diethylphosphine;
diheptylphosphine;
dipentacosylphosphine;
methylhexylphosphine;
amyltridecylphosphine;
diallylphosphine;
dibutadienylphosphine;
dicyclobutylphosphine;
di-(dimethylcyclohexyl)phosphine;
di-(methylcyclobutenyl)phosphine;
ditolylphosphine;
di-(methylnaphthyl)phosphine;
difurfurylphosphine;
propoxyphosphine;
octoxyphosphine;
eicosoxyphosphine;
crotonoxyphosphine;
linoleyoxyphosphine;
cyclopentoxyphosphine;
(methylcyclohexoxy)phosphine;
cyclopentenoxyphosphine;
xyloxyphosphine;
(biphenoxy)phosphine;
(octylthienoxy)phosphine;
isopropyl-isopropoxyphosphine;
2-ethylhexyl(2-ethylhexoxy)phosphine;
heptoxyethylphosphine;
t-butoxytetradecylphosphine;
octadecoxyoctadecylphosphine;
dodecenoxydodecenylphosphine;
octadecenoxyoctadecenylphosphine;
(methylcyclopentoxy) (methylcyclopentyl)phosphine;
cyclohexoxycyclohexyl-phosphine;
(trimethylcyclopentenoxy) (trimethylcyclopentenyl)-phosphine;
benzoxybenzylphosphine;
(dimethylnaphthoxy) (dimethylnaphthyl)phosphine;
furoxyfuroylphosphine;
di-t-butoxyphosphine;
diundecoxyphosphine;
dipentadecoxyphosphine;
dicrotonoxyphosphine;
dioctadecenoxyphosphine;
dicyclopentoxyphosphine;
di-(trimethylhexoxy-)phosphine;
di-(cyclopentadienoxy)phosphine;
di-(waxphenoxy-)phosphine;
di-(biphenoxy-)phosphine;
dithenoxyphosphine;
dibutylphosphine oxide;
dinonylphosphine oxide;
diheptadecylphosphine oxide;
propyloctylphosphine oxide, isobutylpentadecylphosphine oxide;
divinylphosphine oxide;
dibutadienylphosphine oxide;
di(cyclopropyl)phosphine oxide;
di-(dimethylcyclopropyl)phosphine oxide;
dicyclohexenylphosphine oxide;
di-(ethylphenyl-) phosphine oxide;
dinaphthylphosphine oxide;
dipyridylphosphine oxide;
isobutylphosphine oxide;
decylphosphine oxide;
hexadecylphosphine oxide;
allylphosphine oxide;
linoleylphosphine oxide;
(methylcyclopropyl-)phosphine oxide;
cyclobutylphosphine oxide;
(methylcyclohexenyl-)phosphine oxide;
(amylphenyl-)phosphine oxide;
(methylnaphthyl-)phosphine oxide;
indolylphosphine oxide;
pentylpentoxyphosphine oxide;
dodecyldodecoxyphosphine oxide;
tetradecyltetradecoxyphosphine oxide;
butylnonoxyphosphine oxide;
isopropylpentadecoxyphosphine oxide;
dodecenyldodecenoxyphosphine oxide;
butadienylbutadienoxyphosphine oxide;
cyclohexylcyclohexoxyphosphine oxide;
dimethylcyclohexyl(dimethylcyclohexoxy)phosphine oxide;
cyclohexadienylcyclohexadienoxyphosphine oxide;
phenylphenoxyphosphine oxide;
methyl(dimethylnaphthoxy)phosphine oxide;
furylfuroxyphosphine oxide;
methyl hypophosphite;
hexyl hypophosphite;
tridecyl hypophosphite;
vinyl hypophosphite;
linoleyl hypophosphite;
cyclopropyl hypophosphite;
methylcyclohexyl hypophosphite;
cyclobutenyl hypophosphite;
tolyl hypophosphite;
naphthyl hypophosphite;
quinolyl hypophosphite;
ethylhydroxyphosphine oxide;
heptylhydroxyphosphine oxide;
triacontylhydroxyphosphine oxide;
2-propenylhydroxyphosphine oxide;
octadecenylhydroxyphosphine oxide;

cyclobutylhydroxyphosphine oxide;
(methylcyclopentyl-)hydroxyphosphine oxide;
(methylcyclobutenyl-)hydroxyphosphine oxide;
xylylhydroxyphosphine oxide;
(methylnaphthyl-)hydroxyphosphine oxide;
piperidylhydroxyphosphine oxide;
monopropyl phosphite;
monooctyl phosphite;
monopentacosyl phosphite;
monocrotyl phosphite;
monobutadienyl phosphite;
mono-(dimethylcyclopropyl)phosphite;
monocyclopentyl phosphite;
monocyclopentenyl phosphite;
monobenzyl phosphite;
monobiphenyl phosphite;
monopyrryl phosphite;
diisopropyl phosphite;
di-2-ethylhexyl phosphite;
isobutyldecyl phosphite;
propyl tetradecyl phosphite;
dieicosyl phosphite;
didocenyl phosphite;
dilinoleyl phosphite;
di-(methylcyclopropyl) phosphite;
dicyclohexyl phosphite;
di-(trimethylcyclopentenyl) phosphite;
di-(ethylphenyl) phosphite;
di-(dimethylnaphthyl) phosphite;
dipiperidyl phosphite;
thiophosphorus acid;
thiohypophosphorus acid;
methyl thiophosphine;
ethylsulfinophosphine;
butylsulfophosphine oxide;
amidophosphine;
benzylamidophosphine;
dioctylamidophosphine;
selenophosphorous acid;
methylselenophosphine oxide;
tellurophosphorous acid;
decyltellurophosphine;
silicylphosphine;
trichlorosilicylphosphine;
methoxydichlorosilicylphosphine;
dipropoxychlorosilicylphosphine;
tridodecoxysilicylphosphine;
butylthiodichlorosilicylphosphine;
dibutylthiosilicylphosphine;
trioctylthiosilicylphosphine;
methyldichlorosilicylphosphine;
dihexychlorosilicylphosphine;
tridecylsilicylphosphine;
diethylphosphinophosphine;
phosphorous acid;
hypophosphorous acid;
tellurohypophosphorous acid;
dioctyl phosphite;
di-(butyl phosphinico-)benzene;
di-(decyl phosphinico-)hexane;
diphosphinicocyclohexane;
di-(phosphinicooxy-)chlorotoluene;
di-(phosphincooxy-)eicosane;
di-(phosphinicothio-)pinane;
di-(phosphinicothio-)nitrohexane;
(butyl-phosphino-) (diamyl phosphono-) dodecane;
di-(oleylphosphino-)ethane;
ammonium hypophosphite;
ammonium acid phosphite;
barium hypophosphite;
magnesium phosphite;
manganese hypophosphite;
manganese phosphite;
ferric hypophosphite;
nickel hypophosphite;
cupric phosphite;
lead phosphite;
sodium phosphite;
sodium acid phosphite;
sodium hypophosphite;
potasisum hypophosphite;
and potassium phosphite.

The preferred subclass of these compounds, chiefly because of their present availability, are (a) hypophosphorous acid and its salts, as represented by Formula 5; (b) monoesters of hypophosphorous acid, Formula 5b, wherein R is a radical having as many as 18 carbon atoms per molecule, such as, by way of non-limiting example, methyl, ethyl, propyl, isopropyl, butyl, isobutyl, t-butyl, 2-ethylhexyl, decyl, decenyl, octadecyl, octadecenyl, and radicals of branched-chain aliphatic hydrocarbons derived from petroleum sources; (c) phosphorous acid, Formula 7, its sodium salts, and other metal salts thereof; (d) monoesters of phosphorous acid, Formula 7a, wherein R is a radical as defined under (b), supra; (e) diesters of phosphorous acid, Formula 7b, wherein R is a radical hereinbefore defined under (b); and phosphine, and mono- and di-alkyl phosphines, Formulae 1a and 1b.

Any organic compound having at least one unsaturated carbon-carbon linkage is a satisfactory reactant for use in the process of the present invention. It is to be strictly understood, however, that benzene and other aromatic compounds, with the exception of those having side chains containing an unsaturated carbon-carbon linkage, are not included within this definition of the organic compound reactant. [See Whitmore's Organic Chemistry, pp. 692–700 (1937).]

Any olefin, with the exception of those which will not react because of steric factors, is suitable for use in the present process. Likewise, any acetylene is utilizable herein. Non-limiting examples of the olefin reactant are normal 1-olefins, such as, ethylene; propylene; butene-1; pentene-1; hexene-1; heptene-1; octene-1; nonene-1; decene-1; undecene-1; dodecene-1; tridecene-1; tetradecene-1; pentadecene-1; hexadecene-1; and octadecene-1; olefins having branching beyond the 2 position; and straight-chain olefins having internal double bonds, such as, butene-2; hexene-3; octene-2; octene-4; decene-5; octadecene-9; and other similar types obtainable by position isomerization of a 1-olefin and by other means well known in the art.

Commercial sources from which 1-alkenes and normal alkenes having internal double bonds can be obtained are cracked wax, cracked paraffinic oils, wax or paraffinic oils which have been chlorinated and subsequently dehydrochlorinated, and the products obtained from the Fischer-Tropsch synthesis and its variations. Most versions of the Fischer-Tropsch, Synthine, or Hydrocol process yield large amounts of olefins, particularly normal 1-olefins ranging from butene-1 to olefins having 30 to 40 carbon atoms per molecule. These 1-olefins may be isomerized readily to alkenes having internal, rather than terminal, double bonds. Crude mixtures of these olefins may be used, or one can use purified materials, such as for example, butene-1; pentene-1; hexene-1; octene-1; decene-1; octadecene-1; and tetracontene-1. Other commercially available olefin reactants are ethylene polymers of 2 to 100 units, and dimers, trimers, tetramers, pentamers, and higher polymers of other 1-olefins up to and including tetracontene-1.

In addition to the normal alkenes in which the double bond can be terminal or internal, a large variety of other olefins with branched-chain structures are suitable. These include members of the series represented by 1,2-dialkyl ethylenes and 1,1,2-trialkyl ethylenes. Non-limiting examples are isobutylene; isoamylene; isohexenes; isoheptenes; 2,4,4-trimethylpentene-1; 2,4,4,6,6-pentamethylheptene-1; 2,5,7,7-tetramethyl octene-1; 2-ethylhexene-1; 2-ethylbutene-1; 1,1,2-trimethylethane; 1,1-diethyl-2-methylethene; 2,4,4-trimethylpentene-2; and 2,4,4,6,6-pentamethyl heptene-2. Other similar compounds can be used, wherein the substituent alkyl group or groups can have between one and twenty carbon atoms per radical. Many of these olefins are present in diisobutylene, triisobutylene, and dimers of other isoolefins. Some of the tetra-substituted ethanes, such as tetramethylethene, tetraethylethene, and tetra-n-butylethene are satisfactory for use in the process of the present invention. Those containing two or three methyl substituents and a branched-chain radical as the fourth substituent are also suitable. It has been found, however, that several highly branched-chain alkyl groups substituted about the double bond serve to hinder the activity of the double bond to a large extent. Accordingly, olefins such as tetraisopropylethene are not preferred.

The aforementioned aliphatic-substituted olefins include open-chain alkyl radicals as substituents. Any of these alkyl radicals can be replaced by a cycloalkyl, or an alkylated cycloalkyl radical, such as, for example, cyclohexyl, cyclopentyl, ethylcyclohexyl, amylcyclohexyl, octylcyclopentyl, methylcyclopentyl, pinenyl, camphenyl, cyclohexenyl, dimethylcyclopentyl, or trimethylcyclohexyl radicals. These cyclic substituents are equally as satisfactory as the open-chain alkyl groups mentioned hereinbefore.

Most aromatic- and heterocyclic-substituted olefins are utilizable as the olefin reactant. In general, any vinyl aromatic or heterocyclic compound wherein the aromatic or heterocyclic group is substituted for a hydrogen attached to one of the carbon atoms which forms part of the ethylenic group will be suitable, provided that not more than two substituents are present in each ethylenic group. In some cases, olefins containing more than two aromatic or heterocyclic groups may be found suitable, but, in general, steric hindrance will prevent the reaction involved in the present invention from taking place when more than two substituents are present about the ethylenic group. Substitution of an aromatic or heterocyclic group at a point two or more carbon atoms removed from the ethylenic group is essentially equivalent to the substitution of an alkyl group, and steric hindrance will not be encountered. Non-limiting examples of the aromatic- and heterocyclic-substituted olefins are styrene; vinylnaphthylene; vinyldiphenyl; p-methylstyrene; p-ethylstyrene; p-amylstyrene; p-dodecylstyrene; o-butylstyrene; o,p-dimethylstyrene; o,p-dibutylstyrene; α-methylstyrenes; α-methyl-p-methylstyrene; 2,2-dinaphthylethene; 2,2-diphenylethane; β-methylstyrene; 1-methyl-2-naphthylethene; vinylthiophene; and vinylpyridine..

Cyclic olefins are suitable olefin reactants. Non-limiting examples are cyclopropene; cyclobutene; 1-methylcyclobutene-1; cyclopentene; 3-ethylcyclopentene-1; laurolene; 1-propylcyclopentene-1; apofenene; campholene; dihydrosabinene; cyclohexene; 1-ethylcyclohexene-1; pulanene; o-menthene; suberene; encarvene; civetene; limonene; camphene; α-pinene; β-pinene; and santene.

Diolefins are particularly suitable reactants in the present process, since they will produce two types of useful products. Reaction at only one of the double bonds yields unsaturated phosphorus derivatives, such as alkenyl phosphonates, whereas reaction at both double bonds produces diphosphorus-substituted compounds, such as diphosphonates wherein two phosphorus-containing radicals are attached to the same carbon chain through phosphorus-carbon linkages.

Conjugated olefins are utilizable. Butadiene; isoprene; methylpentadiene; dimethylbutadienes; 2,3-diethylbutadiene; 1,4-dibutylbutadiene; octadiene-1,3; decadiene-1,3; 4-ethyloctadiene-2,4; 2,5-dimethyl-3,4-diisopropylhexadiene-2,4; cyclopentadiene-1,3; cyclohexadiene-1,3; 1,4-dimethylcyclohexadiene-1,3; 3-methyl-1-isopropylcyclopentadiene-1,3; α-terpinene; phellandrene; and 1-methyl-3-propyl-4-isopropylcyclohexadiene-1,3 may be mentioned by way of non-limiting examples. Non-conjugated diolefins are equally useful. In fact, when they are employed, the reaction is much easier to control since they do not react with themselves as readily. Non-limiting examples of non-conjugated diolefins are hexadiene-1,5; pentadiene-1,4; 1-vinyl-cyclohexene-3; dipentene; terpenolene; octadecadiene-1,3; decadiene-1,5; menthadiene; tetradecadiene-1,8; heptadiene-1,6; 4-ethylhexadiene-1,4; decadiene-1,9; 3-ethyloctadiene-1,5; tertadecadiene-1,4; 4,5-dipropyloctadiene-2,6; eiscosadiene-1,19; phytadiene; tetratriacontadiene-9,25; cyclohexadiene-1,4; cyclooctadiene-1,5; 3,3-dimethylcyclohexadiene-1,4; 2,6,6-trimethylcycloheptadiene-1,4; γ-terpinene; and cyclotriacontadiene-1,16. These olefins are obtained from many sources well known to those familiar with the art. Mixtures thereof may be obtained by drastic cracking, or halogenation and dehydrohalogenation of paraffinic materials. Aromatic-substituted dienes are also suitable for use herein. Non-limiting examples are divinylbenzenes; divinyltoluenes; divinylnaphthalenes; divinylxylenes; divinylethylbenzenes; divinyldodecylbenzenes; vinylallylbenzene; vinylallylethylbenzene; diallylpropylbenzene; diallylnaphthalene; vinyl-4-butenylbenzene; and cyclooctatetraene. Triolefins and polyolefins are also utilizable. Available olefins of this type include, by way of non-limiting examples, myrcene; alloocymene; hexatriene; dicyclopentadiene; hexatriene-1,3,5; heptatriene-1,3,6; octatriene-2,4,6; 2,5-dimethylhexatriene-1,3,4; 2,6-dimethyloctatriene-2,5,7; 2,6-dimethyl 1 undecatriene - 1,8, 10; tropilidene; and cyclooctatriene-1,3,5.

As has been mentioned hereinbefore, acetylene is utilizable in the process of the present invention. Acetylene itself will add either to one molecule of phosphorus compound reactant to five a vinyl phosphorus compound, or to two molecules to yield an ethane diphosphorus derivative. In addition to acetylene, both mono- and di-substituted acetylenes of both the aliphatic and aromatic series can be used. Non-limiting examples are methylacetylene, ethylacetylene, propylacetylene, butylacetylene, amylacetylene, heptylacetylene, dodecylacetylene, octadecylacetylene, dimethylacetylene, methylethylacetylene, methylpropylacetylene, butylhexylacetylene, methylnonylactylene, methyldodecylacetylene, phenylacetylene, naphthylacetylene, p-methylphenylacetylene, p-dodecylphenylacetylene, o-amylphenylacetylene, methylphenylacetylene, diphenylacetylene, methylnaphthylacetylene, hexylnaphthylacetylene, phenylnaphthylacetylene, vinylacetylene, and divinylacetylene.

In addition to the wide variety of hydrocarbon olefines and acetylenes set forth hereinbefore, there is an even larger group of utilizable reactants wherein the hydrocarbon types carry additional substituents such as bromine, chlorine, fluorine, hydroxyl, carbonyl, ester linkages, carboxyl (free or esterified) and carbonyl groups, and many other groups. These are discussed more fully hereinafter.

Bromine, chlorine, and fluorine can be substituted at random for any of the hydrogens in the aforementioned olefinic and acetylenic compounds. Vinyl chloride: 1,1-dichloroethene; trichloroethene; chloroacetylene; 2-chlorobutadiene; 1-chlorobutadiene; tetrafluoroethene; chlorinated paraffin wax which has been chlorinated to a chlorine content of about 40 percent and then dehydrochlorinated to a chlorine content of 20 to 30 percent; p-chlorostyrene; dibromoacetylene; diiodoacetylene; 1,1,1-trichlorononene-2; propargyl bromide; propargyl chloride; and propargyl iodide are non-limiting example of the types utilizable.

Unsaturated compounds having nitrile groups substituted therein are also suitable reactants. Accordingly, non-limiting examples are acrylonitrile; vinylbenzonitrile; 2-cyanobutadiene; methylacrylonitrile; maleic dinitrile; tetrahydrophthalodinitrile; and aliphatic nitriles containing unsaturated linkages such as are produced by distilling oleic acid with ammonia ($C_{18}$ nitrile with 9-10 unsaturation).

Acid groups, i.e., carboxyl groups, or derivatives thereof can be substituted in any of the aforementioned olefinic compounds. For non-limiting examples, maleic acid, cinnamic acid, tetrahydrophthalic acid, alkenyl succinic acids, sorbic acid, crotonic acid, undecylenic acid, linolic acid, oleic acid, linoleic acid, acrylic acid, methacrylic acid, $\alpha$-propynoic acid, $\alpha$-butynoic acid, $\Delta^4$-pentynoic acid, $\Delta^{10}$-undecynoic acid, the octadecynoic acids (i.e., the $\Delta^5$, $\Delta^6$, $\Delta^7$, $\Delta^8$, $\Delta^9$, and $\Delta^{10}$ acids), behinolic acid and butyndioic acid may be mentioned. In addition to the acids described above, the esters of the acids with aliphatic or aromatic alcohols, or phenols are useful reactants. The esterifying alcohols include methanol; ethanol; propanol; butanol; pentanol; decanol; octadecanol; octadecenol; isopropanol; isobutanol; t-butanol; highly branched alcohols such as are obtained as byproducts in the methanol process; alcohols formed by the reaction of carbon monoxide and hydrogen on olefins such as isobutylene and diisobutylene; cyclohexanol; phenol; $\alpha$-naphthol; glycols; polyglycols; and glycerine.

Amides of the aforementioned carboxylic acids with primary and secondary amines are also utilizable. Amines which can be used to form amides of this type are methylamine, dimethylamine, ethylamine, diethylamine, isopropylamine, diisopropylamine, amylamine, diamylamine, octaylamine, dioctylamine, octadecylamine, dioctadecylamine, methylethylamine, aniline, ethylaniline, toluidines, ethylenediamines, propylenediamines, polyethylenediamines, polypropylenediamines, and diaminobenzenes, by way of non-limiting examples. The acid anhydrides of the aforementioned acids are suitable reactants, such as, for example, maleic anhydride; and anhydrides of acrylic acid, methacrylic acid, and oleic acid, and the like.

Another class of olefins and acetylenes which has been found useful in the present process are those having a substituent hydroxyl group. Non-limiting examples are allyl alcohol, propargyl alcohol, cinnamyl alcohol, octadecenol, vinylphenol, vinylnaphthol, butyn-3-ol-1, and other alcohols and phenols having olefinic or acetylenic groups. The derivatives of the unsaturated alcohols, such as ethers, esters, acetals, and ketols are also suitable. Thus, allyl acetate, allyl butyrate, allyl stearate, allyl oleate, allyl ethers of starch, allyl ethyl ether, allyl hexyl ether, ally oey ether, dially ether, dialyacetal, diallylformal, diallylbutyral, allylethylbutyral, and equivalent derivatives of other unsaturated alcohols may be mentioned by way of non-limiting examples.

Unsaturated amines are utilizable herein. Non-limiting examples thereof are vinylamine; N-methylallylamine; allylamine; palmitoleylamine; oleylamine; linoleylamine; linolenylamine; and abietylamine.

Olefins having within the molecule ketone or aldehyde groups are also utilizable herein. Somewhat specialized conditions are required, however, in that certain of the phosphorus compound reactants will add to ketones and aldehydes to form hydroxy derivatives. Accordingly, with unsaturated ketones and aldehydes conditions can be used to direct the addition to the olefinic group, or phosphorus compound reactants can be added at both the olefinic linkage and the ketone or aldehyde group to produce a product having a phosphorus-carbon bond at the olefinic linkage and a phosphorus-carbon bond, with an alpha hydroxyl group, at the ketone or aldehyde group. Both of these types of compounds are within the scope of the present invention. By way of non-limiting examples of utilizable aldehydes and ketones may be mentioned ethylvinyl ketone, divinyl ketone, mesityloxide, isophorone, phorone, diheptadecenyl ketone, acrolein, 2-ethyl-3-propylacrolein, dioctadecenyl ketone, 4-vinylacetophenone, phenyl vinyl ketone, 4-vinylbenzaldehyde, butyn-3-al-1, propynal, and crotonaldehyde.

Sulfonate groups, i.e., sulfonic acids, esters thereof, sulfonamides, sulfones, and sulfoxides can be present in the olefinic molecules without interfering with their suitability in the present reaction. Likewise, nitro groups can be present. Mercaptan and sulfide substituents can be present, although in some case special conditions will be necessary to overcome interference with the reaction of the present invention.

As will be apparent from the discussion of reactants, set forth hereinbefore, many types of reaction products can be obtained by the present process. It is believed, however, that the following equations will suffice to indicate the basic possibilities inherent in the reaction involved herein. These equations represent the reaction in which phosphorus and hydrogen add to opposite sides of an unsaturated carbon-carbon linkage in accordance with the present invention; A, B, and Y being as set forth hereinbefore:

When an olefinic unsaturated compound is reacted with a phosphorus compound reactant having one hydrogen atom attached to phosphorus, the monomeric addition which is obtained primarily by using a molar excess of phosphorus compound ocurs in accordance with the equation:

(8)

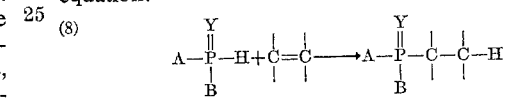

Non-limiting examples of the products of reaction (8) are methyldihexylphosphine; cyclohexoxycyclohexyl(1, 1 - diethyl - 2 - methylethyl-)phosphine; phenyl - 3 - butenylhydroxyphosphine; dipyridylcyclohexylphosphine oxide; dicyclopentoxytrichloroethylphosphine; (hydroxyhexoxyphosphino - ) - methylpropionitrile; (phenoxybutyloxophosphino - )stearic acid; butyl (amylhydroxyoxophosphino-)oleate; (monobutylphosphono-)cinnamide; (dihexadecylphosphono-)succinic acid; diethyl (dialurylphosphino - )cyclohexanedicarboxylate; N,N¹ - dihexyl - (furoxyfurylphosphino - )succinamide; (amylhydroxyphosphino-)hexanol; bis-(diamyloxophosphoino-) heptadecylketone; 4 - diphenoxyphosphinoethylbenzaldehyde; (thenoxyhydroxyphosphino-)propyl ethyl ether; and (di-2-ethylhexylphosphono-)propylamine. Some of the product of reaction (8) is obtained as a dimer or higher polymer thereof, as a result of coupling the monomeric form, e.g., the form

The polymeric forms are produced, mainly, by the action of the free-radical forming catalyst. Thus, the use of more than catalytic amounts of the free-radical forming catalyst favors the coupling reaction to produce polymeric products. A very important reaction of polymerizable olefins and a phosphorus compound reactant having one hydrogen atom attached to phosphorus is the so-called "telomerization" or "chain transfer" reaction:

(9)

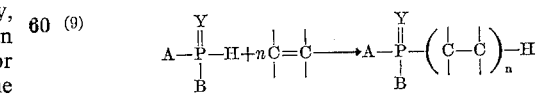

The length of the polymeric chain in the telomer is governed primarily by the molar proportion of the reactants, in accordance with principles which are well known to those skilled in the art. The telogen utilized herein is preferably a phosphorus compound reactant having one hydrogen atom attached to phosphorus. Phosphorus compound reactants having two or three hydrogen atoms attached to phosphorus can be used, however. The mechanism of telomerization has been explained on the basis of a free radical theory, which is discussed hereinafter. A general survey of the art of telomerization, and a discussion of the mechanism involved, have been made by Van Allan [Organic Chemical Bulletin, 20, No. 3 (1948), published by Eastman Kodak Company]. Non-limiting examples of telomer combinations are ethene (25 moles)+didecylphosphine (1 mole); 2-ethylbutene-1 (10)+diamylphosphine oxide (1); pentadiene (100)+thenylhydroxyphosphine oxide (1); methylcyclohexene (50)+hexoxyphenylphosphine oxide (1); chloroprene (500)+butoxypyridylphosphine (1); acrylonitrile (75)+dioctylphosphite (1); sorbic acid (20)+butylnonoxyphosphine (1); vinyl formate (5)+bis(dimethycyclohexoxy-)phosphine oxide (1); vinyl alcohol (2)+dihexylphosphine (1); N-butylacrylamide (6)+amylhydroxyphosphine oxide (1); allyl ethyl ether (15) +dithenoxyphosphine oxide (1); mesityl oxide (10) +monoleyl phosphite (1); and crotonaldehyde (15) +propyloctylphosphine oxide (1).

The reaction between an olefinic unsaturated compound reactant and a phosphorus compound reactant having two hydrogen atoms attached to phosphorus produces several types of products, dependent primarily on the molar proportion of the reactants. There can be addition of one mole of unsaturated compound:

(10)
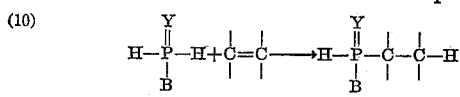

Non-limiting examples of products of reaction (10) are butyloctylphosphine; phenoxy-2-ethylhexoxyphosphine; decenylpinylphosphine oxide; cyclopentylbutoxyphosphine oxide; trichloromonyl(dibutylphosphino-)phosphine oxide; (amidophosphino-)succinic dinitrile; p-nitrophenoxyphosphino-)undecyclic acid; amyl (hexyloxophosphino-)hexenoate; (methoxyoxophosphino-)oleamide; (allyloxophosphinodecyl-)succinic acid; diethyl (linoleylphosphino-)succinate; N,N' - dibutyl(thienyloxophosphino-)succinamide; (hydroxyoxophosphino-)decanol; ethyl (butyloxophosphino-)ethyl ketone; (bariumoxyphosphino - )propenal; (methylcyclopropyloxophosphino-)ethyl oleyl ether; and (amylphosphino-)oleylamine.

Two mole of unsaturated compound can be added to one mole of phosphorus compound reactant, in a stepwise manner:

(11)
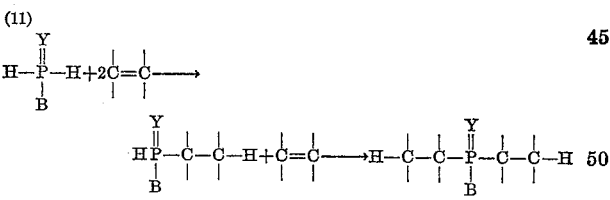

By way of non-limiting examples of products of reaction (11) can be mentioned: di(phenylethyl-)methylphosphine; bis-(diisobutyl-) phenoxyphosphine; sodium bis-octenephosphinate; tributylammonium bis-cyclohexane phosphinate; bis-bromobutyl-(tetrachlorothienyl-)phosphine oxide; methylbis-(propionitrile-)phosphine, i.e.,

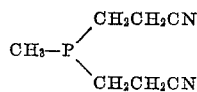

phenylbis - (octadecanoic acid - )phosphine oxide; butylthiobis-(butyl propionate-)phosphine; potassium bis-undecamidephosphinate; thenoxybis-(maleic acid-)phosphine oxide; amylbis-(hydroxypropyl-)thiophosphine; dodecoxybis-(butyral-)selenophosphine; and piperidyl-bis-(octadecylamine-)phosphine. When a molar excess of unsaturated compound reactant is used, products having polymeric chains are produced:

(12)
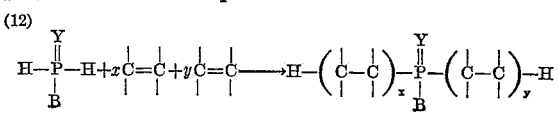

It will be apparent that these polymers are derived by an extension of the telomerization reaction, which has not been contemplated heretofore in the telomer field. Non-limiting examples of combinations of reactants which will produce products in accordance with Equation 12 are butene (6 moles)+butylphosphine (1); isohexene (20)+octadecoxyphosphine (1); cyclohexadiene (28) +amylphosphine oxide; vinyl chloride (100)+phenoxyphosphine oxide (1); crotonitrile (60)+decylammonium hypophosphite (1); acrylic acid (30)+cyclohexoxyphosphine oxide (1); methyl methacrylate (200)+oleylphosphine (1); crotonamide (4)+ethoxyphosphine (1); vinylnaphthol (20)+amylphosphine oxide (1); divinyl ketone (10)+hexylphosphine (1); diallyl ether (6) +chlobenzylphosphine oxide (1); and diallylbutyral (4)+ethoxyphosphine oxide (1).

The reaction of a phosphorus compound having three hydrogen atoms attached to phosphorus with an olefinic unsaturated compound proceeds in many ways, depending on the molar porportion of the reactants. There can be addition of one mole of unsaturated compound:

(13)
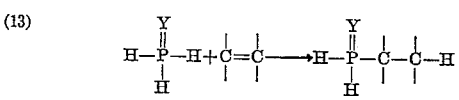

Two moles of unsaturated compound can be added in a stepwise manner:

(14)
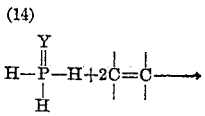

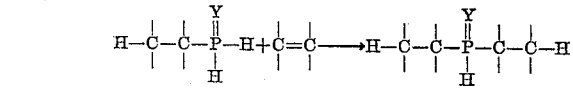

Likewise, three moles of an unsaturated compound can be added stepwise:

(15)
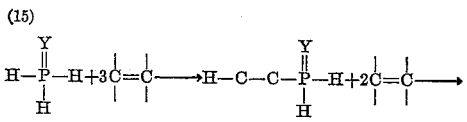

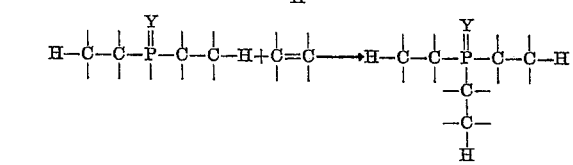

Tetracontylphosphine;
(pentamethylheptyl-)phosphine aluminum trichloride;
dicamphylphosphine;
tris-(vinylcyclohexyl-)phosphine;
chlorowaxphosphine;
phosphinooctadeconitrile;
phosphinolinoleic acid;
phenyl phosphinostearate;
N,N dioctyl phosphinopropionamide;
phosphinosuccinic acid;
dioctadecenyl phosphinosuccinate;
tris-(succinamide-)phosphine;
bis-(butanol-)phosphine;
phosphinoethyl allyl ketone;
bis-(phosphinoheptadecyl) ketone;
phosphinobutyral;
bis-(diethyl ether-)phosphine;
phosphinohexylamine;
tris-(propylamine-)phosphine;
tris-(dichlorofluoroethyl-)phosphine;
bis-(naphthylethyl-)phosphine;

and diphosphonobutane are non-limiting examples of the products produced by reactions (13), (14), and (15).

When a molar excess of unsaturated compound reactant is used, products having polymeric chains are formed, for example:

(16)

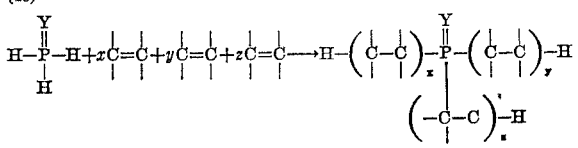

As in the case of the reaction of Equation 12, these polymers are produced by an extension of the telomerization reaction. Nonlimiting examples of combinations of reactants which will produce products in accordance with Equation 16 are:

hexane-2 (6 moles)+phosphine (1 mole);
octadiene (9)+phosphine (1);
2-ethylhexene (12)+phosphine (1);
cyclobutene (19)+phosphine (1);
vinyl fluoride (15)+phosphine (1);
cyanobutadiene (6)+phosphine (1);
undecylenic acid (25)+phosphine (1);
butyl methacrylate (19)+phosphine (1);
vinylphenol (9)+phosphine (1);
divinyl ether (10)+phosphine (1);
phorone (30)+phosphine (1); and
vinylbenzaldehyde (6)+phosphine (1).

Due to the greater degree of unsaturation, the acetylenic unsaturated compound reactants undergo many reactions not possible with the olefinic types, as well as the general reactions possible with the olefinic types. The reaction between an acetylenic unsaturated compound reactant and a phosphorus compound reactant having one hydrogen atom attached to phosphorus can result in the formation of products having olefinic unsaturated groups:

(17)

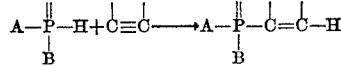

As will be apparent, this olefinic product can act as an olefinic compound reactant, or it can be used as an olefin to undergo the polymerization reactions usually applied to olefins. Non-limiting examples of the products of reaction (17) are (bis-dimethylcyclohexyl-) octenylphosphine;
butenylisopropylisopropoxyphosphine;
isobutylpentadecyloxophosphinopropenyl bromide;
dodecenyldodecenoxyoxophosphinopropenol;
hydroxyoxohexylphosphinoundecylenic acid;
propyl diethylphosphinobutenoate;
N,N'-diamyl dibutylphosphonomaleiamide; and
trichlorosilicylphosphinobutenal.

If a larger molar proportion of phosphorus compound reactant is used, two moles thereof can be added to an acetylenic compound reactant, probably in a stepwise manner:

(18)

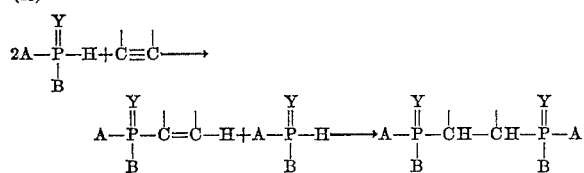

Non-limiting examples of the products of reaction (18) are bis-(diheptylphosphino-)pentane;
bis-(cyclopentylhydroxyoxosphino-) dibromoethane;
bis-(diethylphosphinomethylphosphino-)butanol;
bis-(monopropyl phosphono-)propanoic acid;
ethyl bis-(dibutyloxophosphino-)pentanoate;
bis-(dodecoxythienylphosphino-)succinic acid; and
bis-(dinaphthylphosphino-)propanal.

When the phosphorus compound reactant has two hydrogen atoms attached to phosphorus, there can be addition of one or two moles of acetylenic unsaturated compound reactant, depending largely on the relative molar proportion of the acetylenic reactant:

(19)

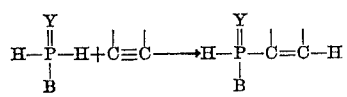

(20)

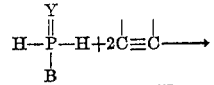

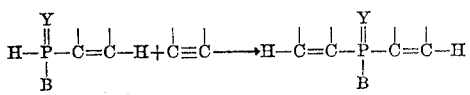

Non-limiting examples of products of reactions (19) and (20) are ethenylphenylbutylphosphine oxide; calcium didodecenylphosphinate; bis - (iodopropenyl - )piperidylphosphine oxide; butylphosphinicodocosenoic acid; bis-(butyl butenoate-)amylphosphine selenide; bis-(maleic acid-)phosphinic acid; bis-(maleamic acid-)phenylphosphine; di - (amylphenyl) cyclohexyloxophosphinomaleate; chloroamylphosphonobutenal; and bis-(propenal-) (octylthienoxy-)phosphine. The products of these reactions can be used as olefinic unsaturated compound reactants, or they can be utilized as olefins to undergo other reactions well known for olefinic compounds. When using relatively large amounts of a free radical-forming catalyst, a polymeric type of product can be produced, for example:

(21)

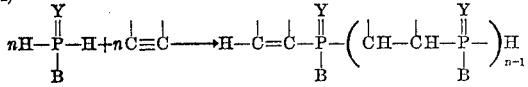

Two moles of phosphorus compound reactant can be added to the acetylenic unsaturated compound reactant, when the phosphorus compound is reacted relatively in excess:

(22)

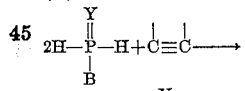

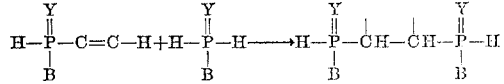

Non-limiting examples of the products of reaction (22) are bis-(amylphosphono-)phenylethane; bis-butyl-phosphinicochloropropane; bis - (thienyloxophosphino-)butanol; decyl bis - (propoxyphosphino-)undecanoate; bis-(cyclohexyltellurophosphino - )octadecanoic acid; bis-(amyloxophosphino-)succinamide; bis-(amidophosphino-)succinic acid; and bis-(naphthoxyphosphino-)propanal.

One, two, or three moles of an acetylenic unsaturated compound can be reacted with a phosphorus compound reactant having three hydrogen atoms attached to phosphorus. The amount of addition will be dependent mainly on the relative molar proportion of the reactants, for example:

(23)

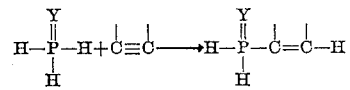

(24)

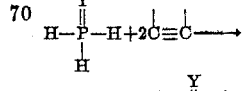

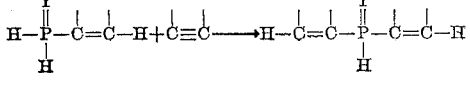

(25)

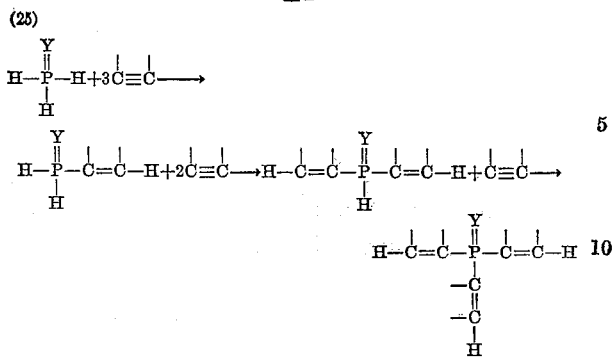

The products of these reactions can be used as olefinic unsaturated compound reactants of this invention, or they can be made to undergo general olefin reactions. For example, the final product of Equation 25 is capable of forming polymers which consist of cross-linked polymeric chains. Non-limiting examples of the products of reactions (23), (24), and (25) are butenylphosphine;
trioctenylphosphine;
didodecenylphosphine;
phosphinobromopropene;
bis-(diiodoethenyl-)phosphine;
tris-(iodopropyl-)phosphine;
phosphinopropenol;
tris-(butenol-)phosphine;
bis-(propenol-)phosphine;
phosphinopropenoic acid;
ethyl phosphinoundecenoate;
N-phenyl phosphinodocosenoamide;
bis-(butenoic acid-)phosphine;
bis-(hexylpentanoate-)phosphine;
bis-(octadecenoamide-)phosphine;
tris-(propenoic acid-)phosphine;
tris-(N-amyl undecenoamide-)phosphine;
phosphinomaleic acid;
dibutyl phosphinomaleate;
bis-(N,N'-didecylmaleamide-)phosphine;
bis-(maleic acid)phosphine;
tris-(maleamide-)phosphine;
tris-(phenyl maleate-)phosphine;
phosphinobutenal;
bis-(propenal-)phosphine; and
tris-(butenal-)phosphine.

In a manner similar to that set forth in Equation 21, complex polymeric types of products can be formed, for example:

(26)

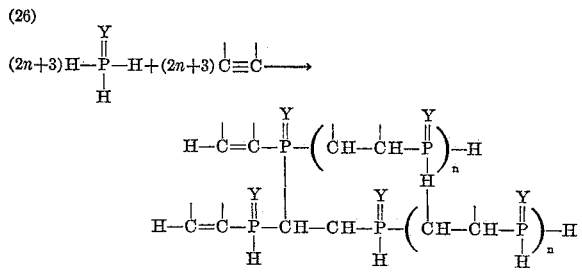

Two moles of the phosphorus compound reactant can be added to the acetylenic unsaturated compound reactant, when an excess of the phosphorus compound reactant is used:

(27)

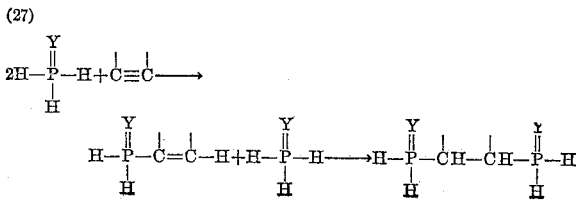

Non-limiting examples of the products of reaction 27 are diphosphino-(p-dodecylphenyl-)ethane; diphosphinododecane; diphosphinochloropropane; diphosphinodiiodoethane; diphosphinobutanal; diphosphinopentanoic acid; oleyl diphosphinoundecanoate; N-thenyl diphosphinodocosanoamide; diphosphinosuccinic acid; monobutyl diphosphinosuccinate; diphosphinosuccinamide; and diphosphinobutanal.

Another type of reaction which is contemplated herein is the reaction between molecules of phosphorus compound reactants having an unsaturated carbon-carbon linkage and a phosphorus-hydrogen linkage in the same molecule. The reaction involved is a form of polymerization, the products of which are similar to the products obtained by reacting phosphorus compound reactants having two or three phosphorus-hydrogen linkages with an acetylenic unsaturated compound reactant, as described in Equations 21 and 26. The reactions can be illustrated by the following equations:

(28)

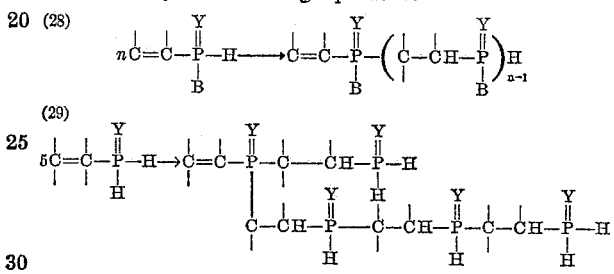

(29)

$$5\overset{|}{C}=\overset{|}{C}-\overset{Y}{\underset{H}{\overset{\|}{P}}}-H \rightarrow \overset{|}{C}=\overset{|}{C}-\overset{Y}{\underset{|}{\overset{\|}{P}}}-\overset{|}{C}----\overset{|}{C}H-\overset{Y}{\underset{H}{\overset{\|}{P}}}-H$$

Non-limiting examples of reactants which can undergo this reaction are vinylphosphine; octadecenylphosphine; dibutadienylphosphine; di - (methylcyclobutenyl-)phosphine; dodecenoxy - dodecenylphosphine; dibutadienylphosphine oxide; divinylphosphine oxide; dicyclohexenylphosphine oxide; allylphosphine oxide; butadienylbutadienoxyphosphine oxide; vinyl hypophosphite; cyclobutenyl hypophosphite; octadencylhydroxyphosphine oxide; monoallyl phosphite; diallyl phosphite; and di-(oleylphosphino-)ethane.

It must be strictly understood that the foregoing illustrations are concerned with the basic types of reactions. The products can be varied by reacting two or more different phosphorus compound reactants and/or two or more different unsaturated compound reactants. For example, the properties and chain length of the products described in Equations 21 and 26 can be modified by substituting a phosphorus compound reactant having one hydrogen atom attached to phosphorus for some of the phosphorus compound reactant used therein, as a so-called "chain-stopper." As those skilled in the art will readily appreciate, many of the reactions set forth hereinbefore take place competitively. Conditions can be varied, however, to produce predominantly the desired product. As has been described hereinbefore, the variation of the molar proportion of the reactants and of the relative amount of catalyst used are the main conditions which control the direction which a given reaction will take.

In many instances, competitive reactions occur, such as polymerization and condensation reactions of the unsaturated compound reactants, or reactions between functional groups in the phosphorus compound reactant and functional groups in the unsaturated compound reactant. The reaction conditions of time, temperature, and molar proportion of reactants can be varied to favor, predominantly, the addition of the phosphorous compound reactant or the interaction of reactants in another manner. Obviously, conditions can also be varied to produce products by a combination of the competing reactions. The effect of varying the reaction conditions has been widely illustrated in the specific illustrative examples set forth hereinafter. Reference can be made thereto for the conditions preferred for producing specific sypes of products.

The reaction of the present invention appears to be a moderately exothermic chain reaction characterized by a high activation energy. In this connection, the reaction strongly resembles polymerization reactions in general, with respect to the reaction conditions. The high activation energy is provided by any source of free radicals or by any set of conditions which will produce free radicals in the reaction mixture. Accordingly, any condition which will result in the formation of free radicals will produce products by means of monomeric addition, dimeric addition, polymerization, telomerization, or any of these types of reactions coupled with further reactions of functional groups. The reactions possible vary with the reactivity of the unsaturated compound reactant and of the phosphorus compound reactant, and with the molar proportion of these reactants. With any given combination of reactants, knowing the properties of each, the possible reaction products will be obvious to a skilled chemist. Very readily polymerizable unsaturated compounds, such as styrene, isoprene, and the acrylate esters, react under conditions determined primarily by those required for the activation of the polymerization of these compounds. On the other hand, less reactive olefins, such as ethylene, octene-1, oleic acid, etc. react under conditions which are characteristic of the phosphorus compound reactant, since activation of the phosphorus-hydrogen bond occurs more readily than the polymerization activation of these olefins.

In accordance with free-radical mechanism theory, in the reaction involved herein, as set forth hereinafter, only a small proportion of high-energy molecules, or free radicals, are required to initiate the chain reactions contemplated. Accordingly, the activation energy may be provided by ultra-violet light of proper wave length acting directly upon the reactants, or by ultra-violet light acting upon a compound such as chlorine, acetone, or upon any other such material which is capable of dissociating under the influence of such light to produce free radicals or atoms. Likewise, energy to initiate the reaction may be provided by materials which will decompose under the chosen temperature conditions to yield free radicals. Materials which produce free radicals to activate polymerization reactions are generally chosen from the following groups: (a) diacyl peroxides at temperatures varying between about 50° C. and about 110° C., such as dibenzoyl peroxide, lauroyl peroxide, bis (p-chlorobenzoyl-)peroxide, bis (2,4-dichlorobenzoyl-) peroxide, bis (m-nitrobenzoyl peroxide, bis (p-nitrobenzoyl peroxide, and acetyl peroxide (usually in dimethyl phthalate solution); (b) di-n-alkyl peroxides, such as dimethyl peroxide, diethyl peroxide, and methylethyl peroxide, at temperatures varying between about 20° C. and about 100° C.; (c) di-secondary-alkyl peroxides at temperatures varying between about 50° C. and about 130° C.; (d) di-t-alkyl peroxides at temperatures varying between about 100° C. and about 200° C., such as di-t-butyl peroxide, di-t-amyl peroxide, $(CH_3CH_2)_3COOC(CH_2CH_3)_3$, and $(CH_3)_3CC(CH_3)_2OOC(CH_3)_3$; (e) substituted alkyl peroxides and arylalkyl peroxides, such as hydroxyheptyl peroxide, $HOCH_2OOCH_3$, $CH_3CH(OH)OOCH_3$, $C_2H_5OOCH_2OH$, $C_2H_5OOCH(OH)CH_3$

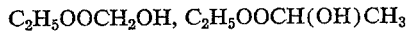

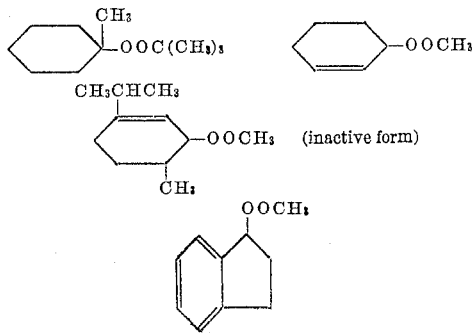

and

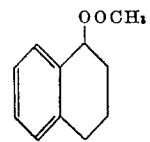

(f) peracids, such as t-butylpermaleic acid and t-butylperphthalic acid; (g) peresters, such as $t-C_4H_9OOC(O)C_6H_5$, $t-C_5H_{11}OOC(O)C_6H_5$

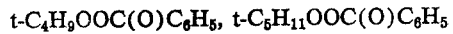

$t-C_4H_9OOC(O)CH=CHCH_3$, and $t-C_4H_9OOC(O)(CH_2)_8CH=CH_2$ (h) hydroperoxides, such as methyl hydroperoxide, ethyl hydroperoxide, isopropyl hydroperoxide, t-butyl hydroperoxide, cumene hydroperoxide, $(C_2H_5)_3COOH$,

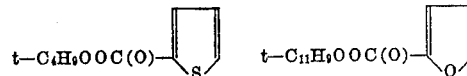

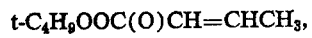

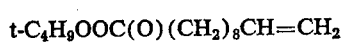 (both the inactive and the d forms)

and

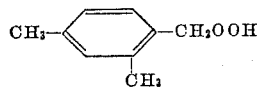

(i) hydrogen peroxide and ferrous sulfate; (j) unstable aromatic-substituted azo compounds such as phenylazotriphenylmethane; (k) aromatic-substituted triazines, such as diazoaminobenzene; (l) aliphatic-substituted triazines, such as dimethyltriazine; (m) aliphatic azo compounds, such as azomethane; (n) azines, such as dimethylketazine, diphenylketazine, sym- and asymmethylphenylketazine, dicyclohexylketazine, acetalazine, benzalazine, and furfuralazine; (o) ketone peroxides, such as methyl ethyl ketone peroxide (usually in 60-percent solution in dimethyl phthalate; (p) aldehyde diperoxides, such as dibenzal diperoxide, the 50-percent tricresyl phosphate solution of which is utilizable at temperatures above 150° C.; (q) metal alkyls such as tetraethyl lead; (r) unstable halides, such as triphenylchloromethane; (s) organic nitrogen compounds, such as chloropicrin, alkyl nitrites, and alkyl nitrates; and (t) free oxygen at temperatures varying between about 130° C. and about 200° C.

The amounts of these peroxides and oxygen necessary to initiate the reaction of the present invention will vary somewhat, dependent on the reactivity of the reagents used; the more reactive reactants requiring relatively less catalyst. In practice, however, amounts varying between about 0.1 mole percent and about 10 mole percent of peroxide are used. However, in order to effect polymerization of reaction products, such as has been discussed in conjunction with Equation 8, more than these catalytic amounts will be necessary. Accordingly, as much as 90 mole percent of free-radical forming catalyst will be used. A concentration of oxygen varying between about 5 and about 2000 parts per million, based on the weight of the unsaturated compound is sufficient. As is well known to those skilled in the art, many compounds other than those set forth hereinbefore, will yield free radicals. Other sources include the thermal decomposition of metal alkyls or azo compounds, and electrolysis of the reaction mixture with formation of atoms and free radicals at the electrodes. Many alternative procedures for producing free radicals are set forth in well-known texts on the subject, such as "The Chemistry of Free Radicals," by W. A. Waters (Oxford Press). These procedures for producing radicals are considered to be within the scope of the present invention, with respect to methods of achieving the activation energy required in the present process. Certain other special systems, such as emulsion systems, may be activated by hydrogen peroxide catalyzed by ferrous iron, or activated by other activation systems well known to the art, and which are described in connection with the emulsion polymerization of synthetic rubbers, styrene, and other materials commercially polymerized by the emulsion process.

The products of the present invention can also be prepared at higher temperatures by direct thermal reactions. In these cases, it appears that the reaction is initiated by the radicals obtained by the direct thermal reaction of the reactant which most readily provides free radicals. Active polymerizable materials, such as styrene, butadiene and isoprene, will undergo the reaction of the present invention at temperatures ranging between about 50° C. and about 150° C. Less reactive materials, such as octene-1 and oleic acid, will require temperatures varying between about 150° C. and about 200° C., and in some cases at temperatures above 200° C., and as high as about 300° C. Phosphorus compound reactants which contain more than one phosphorus-hydrogen bond, as, for example, phosphine or hypophosphorous acid, react at lower temperatures, under thermal conditions, than do those containing only one phosphorus-carbon linkage, as is present in substances such as phosphorous acid.

In accordance with the foregoing, it will be apparent that the temperature of the reaction is critical only to the extent that it is necessary to attain the activation energy of the system used. As might be expected, the reaction temperature is governed primarily by the particular reactants chosen, and also by the type of reaction, i.e., whether the reaction is carried out thermally, catalytically, or under the influence of materials which dissociate to produce free radicals. In general, the temperature chosen will be that at which free radicals are formed and will vary between about ambient temperatures (about 20° C.) and about 300° C. However, sub-zero temperature can be used.

Although there is no desire to limit the invention accordingly, it is believed that the present reaction proceeds in the manner outlined by the following equations:

(30) 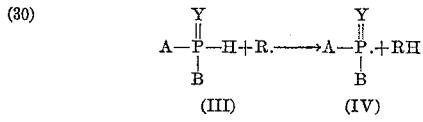

(31) 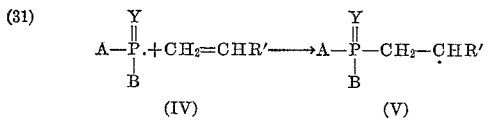

(32) 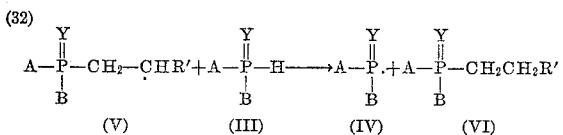

wherein A, B, and Y are as set forth hereinbefore, R. represents a free radical, R' is an organic radical, and the dot (.) in any structural formula denotes that the molecule is present as a free radical. The phosphorus compound reactant (III) reacts with a free radical or atom to produce a new free radical of the phosphorus compound reactant (IV). This free radical adds to an olefinic unsaturated compound reactant, producing a free radical of the product sought (V). The product free radical (V) then reacts with another molecule of the phosphorus compound reactant to form the desired phosphorus-carbon compound (VI), and a phosphorus compound reactant free radical (IV) which can undergo a similar series of reactions to produce more product and to continuously regenerate the free radical (IV).

The time of reaction is not too critical a factor. It is a function of several other variables, such as the type of reactant, amount of reactant, temperature of reaction, and the system employed to initiate the reaction. As will be appreciated by those skilled in the art, longer reaction times are generally required when lower reaction temperatures are employed. Likewise, the amount of heat produced in the exothermic reactions may be so great that a longer time of addition of the source of free radical, with a consequent longer reaction time, will be necessary in order to prevent the reaction mixture from greatly exceeding the desired reaction temperature. When the reaction is carried out using unsaturated compound reactants, such as crotonaldehyde, lower temperatures, and reaction times of the order of about six hours, are indicated. Accordingly, the reaction time will vary between about a few minutes and about 30 hours, depending upon the factors mentioned hereinbefore.

As will be apparent to those skilled in the art, the reaction of the present invention should be carried out with the reactants in intimate contact, either in a homogeneous gas phase or liquid phase, or as an emulsion. In the case of emulsions, the reaction will be almost entirely on the surface of the emulsion particles, and, accordingly, the rate of reaction will depend on the area of surface, i.e., on the fineness of the emulsion. Especially when the reactants are not miscible in each other, mutual solvents may be employed in the reaction. These can be solvents which do not enter chemically into the reaction, or they can be substances which will furnish free radicals under the reaction conditions, such as acetone under the influence of ultraviolet light. In general, however, a solvent is not necessary to the present reaction. When polar solvents, such as water, are used, an increase in reaction rate can sometimes be attained by using alkaline conditions, rather than acidic or neutral conditions, but the reaction, aside from the rate, will be the same. Advantageous use of a solvent can be made to produce esters of phosphorus-containing acids, by reacting a phosphorus-containing acid with an unsaturated compound reactant under esterification temperatures and in the presence of an alcohol solvent, rather than reacting an ester of the phosphorus-containing acid. For example, butyl dioctylphosphinate can be produced either by reacting octylhydroxyphosphine oxide with octene-1, in butanol-1 as the solvent, at esterification temperatures, or by reacting butoxyoctylphosphine oxide with octene-1; using the free radical-producing conditions of the present invention. Non-limiting examples of the solvents utilizable herein are hydrocarbons and hydrocarbon mixtures, such as hexanes, octanes, dodecane, cetane, cyclohexane, petroleum ether naphtha, benzene, toluene, xylene, trimethylnaphthalenes, etc.; alcohols, such as methanol, ethanol, propanol-1, propanol-2, 2-methylpropanol-2 butanol-1, hexanol-1, 2-ethylhexanol-1, 2-ethyloctanol-3, 2,6-dimethyl-3-methylolheptane, dodecanol-1, octadecanol-1, etc.; esters, such as ethyl acetate, n-amyl acetate, isobutyl acetate, n-octyl acetate, methyl propionate, ethyl n-butyrate, methyl n-valerate, ethyl isovalerate, isoamyl isovalerate, ethyl n-heptylate, ethyl pelargonate, etc.; ketones, such as acetone, methyl ethyl ketone, diethyl ketone, hexanone-2, pinacolone, diisopropyl ketone, diisobutyl ketone, di-n-amyl ketone, stearone, cyclohexanone, benzophenone, acetylacetone, etc.; ethers, such as diethyl ether, di-n-propyl ether, diisopropyl ether, methyl n-butyl ether, di-n-amyl ether, di-n-hexyl ether, ethylene glycol dimethyl ether, di-(β-chloroethyl)ether, diphenyl ether, anisole, dioxane-1-4, Carbitols, etc.; polyhydric alcohols, or glycols, such as ethylene glycol, hexamethylene glycol, glycerol, erythritol, propylene glycol, diethylene glycol, triethylene glycol, etc.; mono- and poly-hydroxy aromatic compounds, such as phenol, o-cresol, p-cresol, m-chlorophenol, p-bromophenol, guaiacol, saligenin, carvacrol, p-hydroxyacetophenone, catechol, resorcinol, pyrogallol, etc.; halogenated hydrocarbons, such as chlorinated kerosene, carbon tetrachloride, Freons, tetrachloroethane, hexachloroethane, pentamethylene bromide, o-chlorotoluene, bromobenzene, p-dichlorobenzene, hexachlorobenzene, o-bromoiodobenzene, benzyl trichloride, etc.; heterocyclic compounds, such as pyrrole, furan, coumarone, pyridine, piperidine, etc.; and water.

The reaction product can be isolated by the well-known methods of separation, such as crystallization, solvent extraction, filtration, and distillation, depending on the particular reactants chosen. In general, the reaction product is obtained as the residue, after unreacted materials and byproducts have been distilled out. Some of the products can themselves be distilled from the reaction mixture, usually under reduced pressure.

The following specific examples are for the purpose of illustrating the mode of preparing organic phosphorus compounds having at least one carbon-phosphorus linkage per molecule, by the process of the present invention. It is to be clearly understood, however, that the invention is not to be limited to the specific phosphorus compound reactants and organic compound reactants, or to the operations and manipulations described in the examples. As will be apparent to those skilled in the art, a wide variety of other reactants as set forth hereinbefore may be used to prepare the organic phosphorus compounds contemplated herein.

In the examples, the percent of phosphorus in the products was determined by the gravimetric method. Briefly, this method involves the wet oxidation of the product with sulfuric acid, nitric acid, and 30-percent hydrogen peroxide, followed by double precipitation of magnesium ammonium phosphate. Bromine Number represents the number of centigrams of bromine which are absorbed by one gram of a substance, and indicates the degree of unsaturation of the substance. This value was determined by ASTM method D-875-46T. The neutralization number is the number of milligrams of potassium hydroxide required to neutralize one gram of the material under test. This number, which indicates the acidity of the substance, is obtained by titrating a weighed sample with an alcoholic solution of potassium hydroxide using phenolphthalein as an indicator. Potentiometric titrations were made using a glass-calomel electrode system to measure the potential difference while a substance was being titrated with alcoholic potassium hydroxide. This titration not only gives a neutralization value, but also indicates the number of titratable hydrogen atoms in the molecule under examination.

REACTIONS OF PHOSPHORUS COMPOUNDS HAVING ONE P—H LINKAGE

*Example 1.—Octene-1 reacted with di-n-butyl phosphite in a 1:3 molar proportion in presence of dibenzoyl peroxide.*

A solution of 56 grams (0.5 mole) of octene-1 in 291 grams (1.5 moles) of di-n-butyl phosphite was treated with 14 grams (0.058 mole) of dibenzoyl peroxide, added gradually over a period of 21 hours at a temperature varying between about 80° C. and about 90° C. Then, the excess di-n-butyl phosphite was topped off and the product (159.8 grams) was washed with a 5 percent by weight solution of sodium hydroxide to remove decomposition products of benzoyl peroxide. The washed material was distilled at between 120° C. and 144° C. (143–155° C., pot temperature) under a pressure of .05 to 1.0 millimeter. A distillate weighing 93.8 grams and a residue of 22.0 grams were obtained. The water-white liquid distillate represents a yield of 61.2 percent of theory of di-n-butyl ester of n-octane-phosphonic acid, and it had the following analysis:

| | | |
|---|---|---|
| Percent Phosphorus | Found 10.0 | Theory 10.13. |
| Refractive Index (25° C.) | Found 1.4371 | Reported 1.4370. |

The equation for the foregoing reaction may be postulated to be as follows:

$$C_6H_{13}CH=CH_2 + HP(O)(OC_4H_9)_2 \rightarrow$$
$$C_6H_{13}CH_2CH_2P(O)(OC_4H_9)_2$$

The properties of this product appear to be identical with those reported in J. Am. Chem. Soc., 67, 1180–82 (1945). The identity of the product was further confirmed by the preparation of the n-octanephosphonic acid by hydrolysis of the ester. The derivative was characterized as follows:

| | Found | Theory |
|---|---|---|
| Percent Phosphorus | 15.94 | 15.98 |
| Neutralization Number | 571.2 | 578.3 |
| Melting Point (° C.) | 100–101 | 99.5–100.5 |

*Example 2.—Octene-1 reacted with di-n-butyl phosphite in a 1:1 molar proportion in presence of dibenzoyl peroxide*

A solution of 56 grams (0.5 mole) of octene-1 in 97 grams (0.5 mole) of di-n-butyl phosphite was treated with 13 grams (0.054 mole) of dibenzoyl peroxide added in a step-wise manner at 80–110° C. during a period of 26 hours. The reaction mixture was then topped to 146° C., pot temperature, under one millimeter pressure, giving a low-boiling distillate (I) weighing 17.8 grams. The residue (II), which weighed 140 grams, was divided into two portions, and one portion was subjected to further distillation, under 2.5 millimeters pressure. A second fraction (III) was obtained which boiled at between 137° C. and 165° C. vapor temperature at a pot temperature of between 162° C. and 169° C. The residue (IV) from this distillation was subjected to further distillation up to 270° C. at 3.5 millimeters pressure, but no distillate was obtained. The weight of the distillate (III) was 44 grams and that of the residue (IV) was 53.3 grams. These weights represent a yield of 41.4 percent of the di-n-butyl ester of normal octanephosphonic acid (III) and 50.1 percent of higher boiling polymeric materials (IV) believed to be the dimer of (III). The fractions obtained had the following analyses:

| Fraction | Percent Phosphorus |
|---|---|
| I. (Mainly unreacted di-n-butyl phosphite) | 12.95 |
| II. (Mixture of III and IV) | 9.20 |
| III. (di-n-butyl n-octanephosphonate) | 9.52 |
| IV. (probably dimer of III) | 9.02 |

Theory for di-n-butyl n-octanephosphonate 10.13. Refractive index III (25° C.) = 1.4430 (theory = 1.4370).

The higher-boiling polymer fraction (IV) had the following physical characteristics: a pour point of <−30° F., kinematic viscosities of 18.45 centistokes at 100° F. and of 3.93 centistokes at 210° F., and a viscosity index of 124.5. These are properties which are desirable in a synthetic lubricant.

*Example 3.—Octene-1 reacted with di-n-butyl phosphite in a 1:1 molar proportion in the presence of di-t-butyl peroxide*

A solution of 56 grams (0.5 mole) of octene-1 in 97 grams (0.5 mole) of di-n-butyl phosphite was heated at between 130° C. and 135° C. for 24 hours. During this period, 15 grams (0.103 mole) of di-t-butyl peroxide was added in a stepwise manner. Distillation of the reaction product under 1–5 millimeters pressure gave a fraction boiling between 125° C. and 170° C. vapor temperature, at 145–200° C. pot temperature. This distillate, weighing 105 grams, represents a yield of 68.5 percent of di-n-butyl n-octanephosphonate. It contained 9.38 percent phosphorus (theory=10.13 percent) and had a refractive index at 25° C. of 1.4367 (reported value=1.4370). The properties shown by this product indicate that it is identical with the product obtained in Example 1. The residue of 47 grams shows a conversion of 30 percent to higher polymeric materials.

This residue had the following physical properties: a pour point of $<-30°$ F., kinematic viscosities of 70.97 centistokes at 100° F. and of 10.73 centistokes at 210° F., and a viscosity index of 132.9. These are properties which are desirable in a synthetic lubricant.

*Example 4.—Octene-1 reacted with di-n-butyl phosphite in a 2:1 molar proportion in the presence of di-t-butyl peroxide*

A solution of 112 grams (1 mole) of ocetene-1 and 97 grams (0.5 mole) of di-n-butyl phosphite was stirred and heated at 125° C. for 22 hours. Six grams (0.0411 mole) of di-t-butyl peroxide were added portionwise during the first two hours. The reaction mixture was subjected to distillation under 2 millimeters pressure up to a final liquid temperature of 160° C. No distillate was collected, but 19.2 grams of unreacted octene-1 and decomposition products of the peroxide were found in the dry ice traps. The water-white residue weighed 177 grams. After washing the residue with dilute sodium carbonate solution and distilled water, a product was obtained which appeared to comprise about 78 percent of di-n-butyl hexadecanephosphonate and about 22 percent of a dimer or higher polymer of di-n-butyl octanephosphate. This product contained 8.00 percent phosphorus (theory for $C_{16}H_{33}P(O)(OC_4H_9)_2$=7.41 percent, and a neutralization number of 4.8 (theory is nil). It had the following desirable physical characteristics: a pour point of $<-30°$ F., kinematic viscosities of 9.68 centistokes at 100° F. and 2.48 centistokes at 210° F., and a viscosity index of 85.

*Example 5.—Octene-1 reacted with diethyl phosphite in a 3:1 molar proportion in the presence of di-t-butyl peroxide*

A solution of 672 grams (6 moles) of octene-1 in 276 grams (2 moles) of diethyl phosphite was heated and stirred for 53 hours at 122–138° C. with the portionwise addition of 40 grams (0.274 mole) of di-t-butyl peroxide during this period. The desired reaction temperature of 135° C. was not attained until some of the octene-1 had reacted. The liquid reaction product was subjected to distillation under a pressure of 3.5 millimeters at a liquid temperature of 155° C. A straw-colored residue, weighing 731 grams, was obtained. The difference in weight between the residue and the starting weight of diethyl phosphite indicated that approximately four moles of octene-1 had reacted with two moles of diethyl phosphite. The phosphorus content found of 8.29 percent confirms this relationship (theory for $C_{16}H_{33}P(O)(OC_2H_5)_2$=8.57 percent). This product had the following desirable physical characteristics: a pour point of $<-30°$ F., kinematic viscosities of 14.32 centistokes at 100° F. and of 3.33 centistokes at 210° F., and a viscosity index of 117.

*Example 6.—Octene-1 reacted with di-n-butyl phosphite in a 1:3 molar proportion under ultraviolet light*

A solution of 140 grams (1.25 moles) of octene-1 in 727.5 grams (3.75 moles) of di-n-butyl phosphite was heated and stirred at 120° C. for 8.5 hours with a small 4-watt, U-shaped germicidal lamp extending just below the surface of the solution. After the reaction was stopped, unreacted reactants were removed by subjecting the reaction product to distillation under 2 millimeters pressure at a final liquid temperature of 155° C. The residue weighed 89.4 grams, representing a yield of 23.6 percent. The product contained 11.28 percent phosphorus (theory=10.13 percent).

*Example 7.—Octene-1 reacted with di-n-butyl phosphite in a 1:3 molar proportion under ultraviolet light from a hydrogen discharge lamp*

A solution of 112 grams (1 mole) of octene-1 in 582 grams (3 moles) of di-n-butyl phosphite was irradiated by a beam of ultraviolet light from a hydrogen discharge tube. Heat was applied to raise the reaction temperature to 120° C. over a period of two hours. Heating at 120° C. and the irradiation were continued for 13 hours. Unreacted materials were removed by subjecting the reaction mass to distillation up to a liquid temperature of 163° C. at 3 millimeters pressure. The residue of 53.1 grams was water-washed to produce a clear, yellow oil weighing 44.8 grams. This oil contained 9.97 percent phosphorus (theory for $C_{16}H_{35}O_3P$=10.13 percent).

*Example 8.—Reaction of octene-1 with di-2-ethylhexyl phosphite under ultraviolet light in a 1:1 molar proportion*

A solution of 112 grams (1 mole) of octene-1 in 306 grams (1 mole) of di-2-ethylhexyl phosphite was placed in the ultraviolet light reactor used in the run described in Example 6. Twenty minutes after the light was turned on, the reaction temperature had risen from 25° C. to 35° C. After 16 hours reaction time, the temperature was 46° C., and after 24 hours, when the reaction was stopped, the temperature was 50° C.

The crude reaction product was topped at a pot temperature of 155° C. at 7 millimeters pressure. The toppings weighed 45 grams and had the characteristics of octene-1. The residue weighed 364.5 grams. Therefore, the di-2-ethylhexyl phosphite must have adducted 58.5 grams of octene-1. The di-2-ethylhexyl n-octanephosphonate was not separated from the unreacted di-2-ethylhexyl phosphite. Based on the amount of octene-1 consumed, a yield of 52.2 percent of the 1:1 adduct was obtained. The product contained 8.20 percent phosphorus, as compared to a calculated value of 8.49 percent based on the weight increase.

*Example 9.—Octene-1 reacted with mono-n-amyl phosphite in a 1:1 molar proportion in the presence of dibenzoyl peroxide*

A solution of 185 grams (1.22 moles) of technical grade mono-n-amyl phosphite in 202 grams (1.81 moles) of octene-1 was heated at 85° C. for 22 hours. During the first three hours of the reaction period, 8 grams (0.0331 mole) of benzoyl peroxide were added portionwise. (The technical grade mono-n-amyl phosphite was prepared by reacting 3 moles of crystalline phosphorous acid with 4 moles of n-amyl alcohol with the removal of 3 moles of water of esterification by means of azeotropic distillation with toluene. After topping off the toluene and excess alcohol, a product was obtained which contained 20.74 percent phosphorus (theory for mono-n-amyl phosphite=20.4 percent) and a neutralization number of 400.6 (theory is 369).) Excess octene-1 and the decomposition products of the peroxide were removed by distillation under 2.5 millimeters pressure at a pot temperature of 135° C. The residue weighed 279 grams, indicating a 68.8 percent conversion to mono-n-amyl n-octanephosphonate. This product contained 13.64 percent phosphorus (theory for $C_8H_{17}P(O)(OC_5H_{11})(OH)$=11.75 percent)

And a neutralization number (potentiometric) of 284.5 (theory for $C_8H_{17}P(O)(OC_5H_{11})(OH)$=212.5). Calculated on the basis of the gain in weight and the analysis of the monoamyl phosphite reactant, the theoretical values for percent phosphorus and N.N. are 13.76 and 265.7, respectively.

*Example 10.—Octene-1 reacted with phenylhydroxyphosphine oxide in a 1.5:1 molar proportion using dioxane as a mutual solvent and in the presence of dibenzoyl peroxide*

A solution of 142 grams (1 mole) of phenylhydroxyphosphine oxide, 168 grams (1.5 moles) of octene-1, and 235 grams of dioxane was heated and stirred at 85° C. for 39.5 hours, with 12 grams (0.0496 mole) of dibenzoyl peroxide being added stepwise during the first 23.5 hours.

The crude reaction product was subjected to distillation under 4 millimeters pressure at a maximum liquid temperature of 164° C. The residue weighed 198.6 grams. The residue was dissolved in diethyl ether and water-washed to remove unreacted phenylhydroxyphosphine oxide, which was later recovered. Ether was removed by topping at 164° C. under 4 millimeters pressure, leaving a residue of 127 grams, which is the expected weight for 50 percent reaction. This residue product had an N.N. of 250.5 and it contained 12.76 percent phosphorus. The theoretical values for phenyloctylphosphinic acid are an N.N. of 221 and a phosphorus content of 12.2 percent.

*Example 11.—Octene-1 reacted with phenyl-n-butoxyphosphine oxide in a 1:1 molar proportion in the presence of di-t-butyl peroxide*

A solution of 84 grams (0.424 mole) of phenyl-n-butoxyphosphine oxide and 23.7 grams (0.212 mole) of octene-1 was heated and stirred at 130–135° C. for 21.25 hours. During the first 5.25 hours, 8 grams (0.0548 mole) of di-t-butyl peroxide were added portionwise. The reaction mass was subjected to distillation under 3 millimeters pressure up to a maximum liquid temperature of 135° C., at which point incipient decomposition seemed to occur. At this stage, a portion of the product (92.9 grams) was diluted with another 23.7 grams (0.212 mole) portion of octene-1. Then it was heated and stirred at 135° C. for 19.25 hours, 6 grams (0.0411 mole) of di-t-butyl peroxide being added during the first 2 hours. The reaction mass was topped free of unreacted octene-1 and decomposition products of the peroxide at 110° C. under 3 millimeters pressure. The residue was a moderately viscous, yellow oil, weighing 111.4 grams. It contained 10.02 percent phosphorus. The theoretical phosphorus content of butyl phenyloctylphosphinate is 10.00 percent.

*Example 12.—Octene-1 reacted with dioctylphosphine oxide in a 1.5:1 molar proportion using xylene solvent and in the presence of di-t-butyl peroxide*

A solution of 13.7 grams (0.05 mole) of dioctylphosphine oxide, 8.4 grams (0.075 mole) of octene-1, and 20 cubic centimeters of xylene was heated and stirred for 19 hours at 130–140° C. During the first 3.25 hours, 6 grams (0.0411 mole) of di-t-butyl peroxide were added. The reaction mass was subjected to distillation under 3.5 millimeters pressure at 140° C., leaving a 22.1 gram residue. The weight of product indicates that all of the octene-1 combined with the phosphorus compound reactant. Accordingly, the product is apparently a mixture of trioctylphosphine oxide and dioctylhexadecylphosphine oxide. This product contained 6.59 percent phosphorus (theory for an equimolar mixture is 7.40 percent).

The dioctylphosphine oxide used herein contained 11.01 percent phosphorus (theory=11.3 percent) and showed approximately one active hydrogen atom per mole (Zerewitinoff determination). The N.N. of the sample was 8.91, showing that the major proportion of the sample was of a type not titratable by ordinary basic reagents. Thus, it is apparent that the hydrogen atom is attached directly to phosphorus. The melting point of the white, crystalline, solid material was 83.5–84.5° C.

*Example 13.—Dodecene-1 reacted with diethyl phosphite in a molar proportion of 1:3 in the presence of cumene hydroperoxide*

A solution of 252 grams (1.5 moles) of dodecene-1 in 621 grams (4.5 moles) of diethyl phosphite was heated at 117–120° C. for 21 hours. During the first 5.5 hours of heating, 21 grams (0.1 mole active ingredient) of technical grade cumene hydroperoxide were added in small portions. The decomposition products of and the impurities in the peroxide catalyst, unreacted dodecene-1, and the excess diethyl phosphite were topped off at a pot temperature of 165° C. under 3 millimeters pressure. The water-white residue, weighing 286.8 grams, represented a 62.5 percent yield of diethyl n-dodecanephosphonate. It contained 10.71 percent phosphorus (theory for $C_{12}H_{25}P(O)(OC_2H_5)_2$=10.13 percent). A portion of this product was hydrolyzed with concentrated hydrochloric acid to produce n-dodecanephosphonic acid. The white, solid acid had a melting point of 98.5–99° C. In admixture with a known sample of n-dodecane-phosphonic acid prepared as described in J. Am. Chem. Soc., 67, 1180–82 (1945), it did not depress the melting point.

*Example 14.—Thermal reaction of dodecene-1 with di-n-butyl phosphite in a 1:3 molar proportion*

A solution of 56 grams (0.33 mole) of dodecene-1 in 194 grams (1 mole) of di-n-butyl phosphite was heated and stirred at about 160° C. for 6 hours. Unreacted dodecene-1 and di-n-butyl phosphite were topped off under 4.5 millimeters pressure at 165° C. pot temperature, leaving a residue (I) weighing 39.6 grams. The distillate (II) (210 grams) was further heated at 180° C. for 5 hours and 20 minutes. Topping of this product under 1 millimeter pressure at a pot temperature of 120° C. gave a residue (III) of 64.7 grams and a distillate (IV) of 143 grams. Reheating of (IV) for 3 hours at about 180° C. gave a product consisting of a residue (V) of 25.8 grams and a distillate (VI) of 115 grams after topping to a 145° C. pot temperature under 1.5 millimeters pressure.

The residues, I, III, and V, were combined and subjected to further distillation. A short forerun of 3.6 grams (VII) was obtained and then the main distillate (VIII) weighing 68.8 grams was collected at 160–185° C. vapor temperature (202–228° C. pot temperature) under 2–4 millimeters pressure. The residue weighed 50 grams. The distillate VIII represents a yield of 57 percent of di-n-butyl n-dodecanephosphonate and its analysis compares favorably with that set forth in J. Am. Chem. Soc., 67, 1180–82 (1945). The reaction involved may be postulated to proceed in accordance with the following equation:

$$C_{10}H_{21}CH=CH_2+HP(O)(OC_4H_9)_2 \rightarrow$$
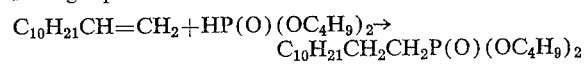
$$C_{10}H_{21}CH_2CH_2P(O)(OC_4H_9)_2$$

ANALYSIS OF FRACTION VIII

| | Found | Theory |
|---|---|---|
| Percent phosphorus | 9.7 | 8.56 |
| Refractive Index (25° C.) | 1.4371 | 1.4432 |

The analysis of the sample shows the presence of other products. However, the identity of the main portion of VIII was ascertained by hydrolysis to n-dodecanephosphonic acid which had the following analysis:

| | Found | Theory |
|---|---|---|
| Percent phosphorus | 12.1 | 12.4 |
| Neutralization Number | 440 | 448.8 |
| Melting point, ° C. | 99–100.5 | 100.5–101.5 |

The mixed melting point with n-dodecanephosphonic acid prepared in accordance with the aforementioned article was 99–100.5° C. The melting point of the acid prepared in accordance with the article was 99–100.5° C. It will be apparent, therefore, that the product obtained in this example was di-n-butyl n-dodecane-phosphonate of reasonable purity.

*Example 15.—Dodecene-1 reacted with mono-n-butyl phosphite in a molar proportion of 1:1 in the presence of di-t-butyl peroxide*

A solution of 138 grams (1 mole) of technical grade mono-n-butyl phosphite in 168 grams (1 mole) of dodecene-1 was heated at 135° C. for 22 hours. Six grams (0.0411 mole) of di-t-butyl peroxide were added portionwise during the first two hours.

Mono-n-butyl phosphite is the main constituent of the bottoms from the preparation of di-n-butyl phosphite. The main contaminants therein are small amounts of phosphorous acid, di-n-butyl phosphate, mono-n-butyl phosphate, and phosphoric acid. The ester used in this preparation has a phosphorus content of 23.59 percent (theory for mono-n-butyl phosphite=22.4 percent) and a neutralization number of 510.5 (theory=406).

The unreacted dodecene-1 was removed by subjecting the reaction mass to distillation under 5.5 millimeters pressure at a liquid temperature of 137° C. The residue weighed 259.2 grams, showing that 72 percent of the olefin had added to the technical grade mono-n-butyl phosphite. The crude mono-n-butyl n-dodecanephosphonate product contained 12.55 percent phosphorus and had neutralization numbers (potentiometric) of 202.7 and 281.4 (theoretical values for mono-n-butyl n-dodecanephosphonate are 10.13 percent and 183.3, respectively). Calculated on the basis of weight increase and of the analysis of the technical grade mono-n-butyl phosphite, the percent phosphorus and the neutralization numbers are 12.55 percent, and 189 and 272, respectively.

*Example 16.—Octene-2 reacted with diethyl phosphite in a 1:3 molar proportion in the presence of di-t-butyl peroxide*

A solution of 336 grams (3 moles) of octene-2 in 1242 grams (9 moles) of diethyl phosphite was heated to about 135° C. and stirred at that temperature for ten hours, 27 grams (0.185 mole) of di-t-butyl peroxide being added during that period of time. Upon subjecting the reaction mass to distillation under 1 millimeter pressure, a fraction weighing 591.7 grams (79 percent conversion) distilled at a vapor temperature of 100–116° C. This fraction contained 12.69 percent phosphorus and had a potentiometric neutralization number of 2.28. The theoretical values for diethyl octanephosphonate are 12.4 percent phosphorus and a neutralization number of nil.

*Example 17.—Octene-2 reacted with di-n-butyl phosphite in 1:3 molar proportion in presence of dibenzoyl peroxide*

A solution of 56 grams (0.5 mole) of octene-2 in 291 grams (1.5 moles) of di-n-butyl phosphite was treated at 90–95° C. with 13 grams (0.054 mole) of dibenzoyl peroxide added portionwise over a period of 26 hours. Excess di-n-butyl phosphite and decomposition products of dibenzoyl peroxide were topped off leaving a residue of 145.8 grams (I). Part of residue (I) (78.8 grams) was subjected to further distillation under 1 millimeter pressure. A water-white distillate (II), weighing 63.5 grams boiling between 118° C. and 149° C. at a pot temperature of 142–185° C., was collected. The residue (III) weighed 14 grams. The distillate (II) represented a yield of 77 percent of di-n-butyl octane-phosphonate, based on the olefin. This reaction may be postulated to proceed in accordance with the equation:

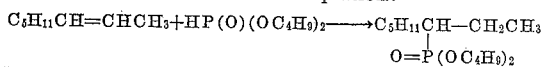

or

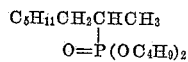

Residue I contained 10.30 percent phosphorus, distillate (II) (di-n-butyl ester of 2- or 3-n-octanephosphonic acid showed 10.00 percent phosphorus, and residue (III) (probably a dimer of II) had 10.40 percent phosphorus. The theoretical phosphorus content for the 1:1 adduct is 10.13 percent. These products are believed to be new compositions of matter.

*Example 18.—2-ethylhexene-1 reacted with diethyl phosphite in a 1:3 molar proportion in the presence of di-t-butyl peroxide*

A solution of 448 grams (4 moles) of 2-ethylhexene-1 in 1656 grams (12 moles) of diethyl phosphite was heated at 130–140° C. for 30 hours. During the first 5 hours, 32 grams (0.219 mole) of di-t-butyl peroxide were added in small portions. The reaction mass was then fractionated into various fractions as set forth in Table I. The phosphorus content for each fraction is included in the table.

TABLE I

| Fraction | Vapor Temp., °C. | Liquid Temp., °C. | Press., mm. | Weight, g. | Phosphorus Content, Percent |
|---|---|---|---|---|---|
| 1 | 52–61 | 70–82 | 3–4 | 831.0 | 22.16 |
| 2 | 75–85 | 119–121 | 3.5 | 100.6 | 20.89 |
| 3 | 85 | 121–117 | 3.5–3.0 | 151.0 | 16.29 |
| 4 | 101–109 | 117–120 | 3.0 | 256.1 | 12.75 |
| 5 | 109 | 121–122 | 3.0 | 368.1 | 12.54 |
| 6 | 106–98 | 122–123 | 3.0 | 86.4 | 12.84 |
| 7 | | Residue | | 241.7 | 15.93 |

Fractions 4, 5, and 6 are substantially pure diethyl 2-ethylhexanephosphonate, the theoretical phosphorus content therefor being 12.4 percent.

The identity of Fraction 4 was ascertained by hydrolyzing 240.2 grams of the material with concentrated hydrochloric acid. A viscous, pale yellow oil weighing 162.3 grams was obtained. This product had an analysis which very closely approximated the analyses of 2-ethylhexanephosphonic acid. This acid contained 15.96 percent phosphorus and had potentiometric neutralization numbers of 301.8 and 570.9. Theoretical values for 2-ethylhexanephosphonic acid are 15.98 percent phosphorus and neutralization numbers of 289 and 578.

*Example 19.—2-ethylhexene-1 reacted with diethyl phosphite in a molar proportion of 3:1 in the presence of di-t-butyl peroxide*

A solution of 672 grams (6 moles) of 2-ethylhexene-1 in 276 grams (2 moles) of diethyl phosphite was heated and stirred for 53 hours at 120–125° C., with the portionwise addition of 40 grams (0.274 mole) of di-t-butyl peroxide during this period of time. The desired temperature for the maximum efficiency of the catalyst, 135° C., was never attained, because too much olefin remained to allow the reflux temperature to reach 135° C. Upon subjecting the reaction mass to distillation under 3.8 millimeters pressure at liquid temperatures up to 142° C. and at vapor temperatures up to 126° C., a light-straw colored residue weighing 358 grams was obtained. The weight of this residue indicates incomplete reaction. This residue contained 11.95 percent phosphorus (theoretical values for $C_8H_{17}P(O)(OC_2H_5)_2$=12.4 and for $$C_{16}H_{33}P(O)(OC_2H_5)_2=8.57)$$

It had a neutralization number of 73.9 (theory=nil). This product had kinematic viscosities of 6.34 centistokes at 100° F. and of 1.88 centistokes at 210° F., and a viscosity index of 79.5.

The high neutralization number of the residue indicated that some hydrolysis had taken place; probably of diethyl phosphite to monoethyl phosphite. Presence of such a contaminant would also make the phosphorus content higher. Therefore, a portion of the residue was subjected to hydrolysis in the presence of concentrated hydrochloric acid. The product thus obtained appeared to be dodecanephosphonic acid, but it will be apparent that it was a mixture of approximately equimolecular amounts of a hexadecanephosphonic acid and 2-ethylhexanephosphonic acid. This product had a phosphorus content of 11.72 percent and potentiometric neutralization numbers of 239.7 and 448.5. Theoretical values for dodecanephosphonic acid are 12.4 percent phosphorus and neutralization numbers of 224 and 448.

*Example 20.—Reaction of 2-ethylhexene-1 with di-n-butyl phosphite in 1:3 molar proportion in the presence of di-t-butyl peroxide*

A solution of 56 grams (0.5 mole) of 2-ethylhexene-1 in 291 grams (1.5 moles) of di-n-butyl phosphite was heated at 130–139° C. for 18 hours. Six grams (0.0411 mole) of di-t-butyl peroxide were added stepwise during the first three hours of the reaction. The reaction product was topped to remove the excess di-n-butyl phosphite and the decomposition products of the peroxide. This left a residue of 154 grams, which represents a 100 percent yield of the 1:1 adduct (di-n-butyl 2-ethylhexanephosphonate) based on the original amount of olefin. The product contained 11.77 percent phosphorus (theory=10.13 percent). A portion of the product was subjected to further distillation and gave a distillate (I) weighing 102 g. and boiling between 139° C. and 155° C. under 3.5 millimeters pressure, and a residue (II) weighing 39 grams. Distillate I contained 10.85 percent phosphorus (theory for 1:1 adduct=10.13 percent), and residue II contained 14.39 percent phosphorus. The product appears to be a new composition of matter.

*Example 21.—2-ethylhexene-1 reacted with 2-ethylhexyl-hydroxyphosphine oxide in the presence of di-t-butyl peroxide*

A solution of 160 grams of technical grade 2-ethylhexylhydroxyphosphine oxide, produced in Example 60, post, in 56 grams (0.5 mole) of 2-ethylhexene-1 was heated and stirred for 7.5 hours at 132–135° C. Eight grams (0.0548 mole) of di-t-butyl peroxide were added portionwise during the first four hours of reaction. The reaction mass was topped at 129° C. liquid temperature under a pressure of 3.5 millimeters pressure to produce a residue which weighed 205.8 grams. This was a yellow, mobile liquid.

The gain in weight, from the starting material to the final residue, of 45.5 grams corresponds to that which would be expected for the reaction of the 2-ethylhexylhydroxyphosphine oxide calculated to be present in the product of Example 48 along with bis-2-ethylhexanephosphinic acid, to convert the entire product to bis-2-ethylhexanephosphinic acid. The final residue contained 10.58 percent phosphorus (theory for $C_{16}H_{35}PO_2$=10.68 percent). It had a (potentiometric) neutralization number of 206.5 (theory is 193.4).

*Example 22.—Diisobutylene reacted with di-n-butyl phosphite in a 1:3 molar proportion in the presence of di-t-butyl peroxide*

A solution of 56 grams (0.5 mole) of commercial diisobutylene in 291 grams (1.5 moles) of di-n-butyl phosphite was heated at 130–140° C. for 24 hours. Ten grams (0.0685 mole) of di-t-butyl peroxide was added portionwise during the first 5 hours of the reaction. The reaction product was topped to remove excess di-n-butyl phosphite and decomposition products of the peroxide leaving a residue (I) of 143.3 grams. Based on the amount of diisobutylene used, this represents a yield of 93.7 percent of materials boiling higher than the reactants. On distilling (I) up to a pot temperature of 205° C., at 2 millimeters pressure, 93.9 grams of product (II) (presumably the 1:1 diisobutylene-di-n-butyl phosphite adduct) was collected as the distillate. This represents a yield of 61.3 percent of theory. A viscous, amber-colored residue (III) weighed 49.4 grams. Product (II) contained 10.80 percent phosphorus (theory=10.13 percent), and residue (III) showed 16.03 percent phosphorus. These products are believed to be new compositions of matter.

*Example 23.—Mixed nonenes reacted with di-n-butyl phosphite in a molar proportion of 1:3 in the presence of di-t-butyl peroxide*

A solution of 504 grams (about 4 moles) of a propylene polymer fraction boiling in the nonene range in 2328 grams (12 moles) of di-n-butyl phosphite was heated at 135° C. for 21 hours. Twenty-four grams (0.1644 mole) of di-t-butyl peroxide were added at the rate of 4 grams per hour during the first five hours. The reaction mixture was then fractionated as indicated in Table II. Analyses of each fraction are included in the table.

TABLE II

| Fraction | Vapor Temp., °C. | Liquid Temp., °C. | Press., mm. | Weight, g. | Phosphorus Content, percent |
|---|---|---|---|---|---|
| 1 | 97 | 120 | 1 | 1571.6 | excess reagent |
| 2 | 99–110 | 125–135 | 1.5–1.0 | 89.4 | 13.63 |
| 3 | 110–118 | 135–138 | 1 | 90.8 | 11.69 |
| 4 | 118–123 | 138–143 | 1 | 216.8 | 10.70 |
| 5 | 123 | 143 | 1 | 70.5 | 10.51 |
| 6 | 123–128 | 143–151 | 1 | 128.3 | 10.20 |
| 7 | 128–135 | 151–153 | 1.0–1.5 | 181.7 | 9.94 |
| 8 | 135–140 | 153–158 | 1.5 | 148.0 | 9.70 |
| 9 | 130–145 | 152–169 | 2.0–2.5 | 26.5 | 9.92 |

The theoretical phosphorus content for a di-n-butyl nonanephosphonate is 9.67 percent.

The residue from this distillation weighed 281.4 grams. It contained 10.67 percent phosphorus and showed a neutralization number of 66.3. Extraction of this residue with sodium carbonate solution followed by water washing, yielded a raffinate (I) weighing 141 grams. A benzene extraction of the caustic washes produced 34 grams of a light-yellow oil (II). The water-carbonate washes were acidified and the oil which separated was water washed. This oil (III) was orange in color and it weighed 69.5 grams. The residue components had the following analyses:

| | Phosphorus, Percent | | Neutralization Number | |
|---|---|---|---|---|
| Fraction | Found | Theory | Found | Theory |
| I | 9.66 | [1] 9.67 | 4.48 | [1] nil |
| II | 9.62 | [1] 9.67 | 2.05 | [1] nil |
| III | 11.68 | [2] 11.7 | 171.2 | [2] 13 |

[1] Values for $C_{17}H_{37}O_3P$.
[2] Values for $C_{13}H_{29}O_3P$.

Products I and II appear to be dimers or higher polymers of di-n-butyl nonanephosphonates. Product III resembles closely the analysis of a mono-n-butyl nonanephosphonate, a decomposition or hydrolysis product of the main reaction product.

*Example 24.—Octadecene-1 reacted with di-n-butyl phosphite in a 1:3 molar proportion in the presence of di-t-butyl peroxide*

A solution of 1010 grams (4 moles) of octadecene-1 in 2328 grams (12 moles) of di-n-butyl phosphite was heated to 135° C., and 25 grams (0.171 mole) of di-t-butyl peroxide were added stepwise over a period of 5.5 hours. Heating and stirring were continued at 135° C. for an additional 15.5 hours. The decomposition products of the peroxide and the excess di-n-butyl phosphite were removed by distillation under 3 millimeters pressure at a maximum pot temperature of 190° C. and at a maximum vapor temperature of 108° C. The residue was a pale yellow oil weighing 1767.7 grams. This corresponds to a 99.0 percent conversion to di-n-butyl n-octadecanephosphonate. The residue contained 7.04 percent phosphorus (theory for $C_{26}H_{55}O_3P=6.95$ percent) and had a neutralization number of 12.7 (theory is nil). It had the following physical properties: a pour point of 55° F., kinematic viscosities of 17.80 centistokes at 100° F. and of 4.27 centistokes at 210° F., and a viscosity index of 169.1.

The residue was further distilled under 6 microns pressure. The main distillate was di-n-butyl n-octane-phosphonate. The last fraction, which distilled between 180° C. and 220° C. at 10.1–18.9 microns pressure was a solid at room temperature. Upon recrystallization from hexane, a white solid melting at 56–57° C. was obtained. It contained 7.71 percent phosphorus and had a neutralization number of 139.6. This product appears to be mono-n-butyl n-octadecane-phosphonate which contains 7.95 percent phosphorus and which has a neutralization number of 143.9.

*Example 25.—Octadecene-1 reacted with diethyl phosphite in a 1:3 molar proportion in the presence of di-t-butyl peroxide*

A solution of 757.5 grams (3 moles) of octadecene-1 in 1242 grams (9 moles) of diethyl phosphite was heated to 135° C., and 24 grams (0.1644 mole) of di-t-butyl peroxide were added portionwise during a six-hour period. The reaction mixture was heated further for 16 hours. Peroxide decomposition products and excess diethyl phosphite were removed by subjecting the reaction mass to distillation under 2.5 millimeters pressure at a pot temperature of 182° C. The residue weighed 1199.5 grams. This weight of residue represents a conversion to diethyl n-octadecanephosphonate of 102 percent of theory. The obviously impossible yield can be accounted for only by assuming an error in weighing out the octadecene-1. The residue contained 7.82 percent phosphorus (theory for $C_{22}H_{47}O_3P=7.95$ percent). The product was further characterized by converting a portion to n-octadecanephosphonic acid by hydrolysis using concentrated hydrochloric acid. The crude acid thus obtained was purified by recrystallization from acetone. The purified acid contained 9.40 percent phosphorus (theory for $C_{18}H_{39}O_3P=$ 9.28 percent).

*Example 26.—Oleic acid reacted with di-n-butyl phosphite in a 1:3 molar proportion in presence of di-t-butyl peroxide*

A solution of 141.25 grams (0.5 mole) of oleic acid and 291 grams (1.5 moles) of di-n-butyl phosphite was heated at 132–140° C. for 6 hours. Six grams (0.0411 mole) of di-t-butyl peroxide were added stepwise throughout the first 3 hours of the reaction. Excess di-n-butyl phosphite and di-t-butyl peroxide decomposition products were removed from the product at a pot temperature of 175° C., under 1.5 millimeters pressure. The residue (I) weighed 222.8 grams. Correcting for the amount of unreacted oleic acid present in the residue (I) (based on the amount of di-n-butyl phosphite used) a yield of 199.5 grams of the 1:1 adduct, or 83.7 percent of theory, was obtained. This product had the following analysis:

| | Found | Theory | |
|---|---|---|---|
| | | 1:1 Adduct | 83.7% Conversion |
| Percent phosphorus | 6.86 | 6.51 | 5.45 |
| Bromine Number | 14.0 | 0 | 10.4 |
| Neutralization Number | 139.3 | 117.8 | 131.0 |

Potentiometric titration data showed that part of the acidity was due to hydrogen attached to phosphorus. It has been shown experimentally that ester interchange occurs between the carboxyl group of the oleic acid and the butoxy groups of the phosphite reactant. In order to determine whether the high phosphorus content was due to the presence of monobutyl phosphite formed by ester interchange, the product was waterwashed to remove any of this acid which may have been present. This procedure gave a product having 4.5 percent phosphorus, a bromine number of 15.5 and a neutralization number of 74.4. From these data, the following composition of the residue (I) was calculated:

| | N.N. | Percent P | Br. No. |
|---|---|---|---|
| 24.3% oleic acid [a] | 48.3 | 0 | 15.5 |
| 22.2% 1:1 adduct [b] | 26.1 | 1.44 | 0 |
| 53.5% butyl ester of 1:1 adduct [c] | 0 | 3.12 | 0 |
| 100.0% Composition analysis | 74.4 | 4.56 | 15.5 |

[a] Calculated on basis of bromine number.
[b] Calculated on basis of N.N. after correcting for oleic acid.
[c] Determined by difference.

The assumption that there was no monobutyl phosphite-oleic acid adduct present is justified by potentiometric titration data which showed one break in the titration curve at pH 9.2. An acid of phosphorus would titrate at a pH of 6–8. It was assumed, however, that no butyl oleate was present. The 1:1 adduct and the ester thereof are believed to be new compositions of matter.

*Example 27.—Oleyl alcohol reacted with di-n-butyl phosphite in a 1:3 molar proportion in presence of di-t-butyl peroxide*

A solution of 67 grams (approximately 0.25 mole) of technical oleyl alcohol (Du Pont "Ocenol") in 145.5 grams (0.75 mole) of di-n-butyl phosphite was heated to 135° C. and 6 grams (0.041 mole) of di-t-butyl peroxide were added during the first three hours. The reaction mixture was further heated at 135° C. for three hours, and then topped at a pot temperature of 180° C., under 1.5 millimeters pressure. The residue weighed 133.8 grams and represents an apparent yield of 115.8 percent of theory, assuming that "Ocenol" is pure oleyl alcohol. The product contained 10.57 percent phosphorus (theory for $C_{26}H_{55}O_4P=6.7$ percent) and had a Bromine Number of 1.5 (theory for $C_{26}H_{55}O_4P=0$). It was found that alcoholysis of the di-n-butyl phosphite with oleyl alcohol had taken place during the reaction. Thus, it was concluded that it is possible for one molecule of oleyl alcohol to add to two phosphorus atoms, in accordance with the following equation:

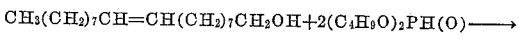
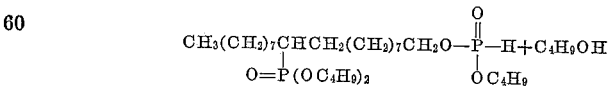

The formation of this compound or similar compounds accounts for the apparent high yield and high phosphorus-content of the product.

*Example 28.—Maleic acid reacted with di-n-butyl phosphite in a 1:3 molar proportion in the presence of dibenzoyl peroxide*

A solution of 38.6 grams (0.33 mole) of technical maleic acid in 194 grams (1 mole) of di-n-butyl phosphite was treated with 11.0 grams (0.0455 mole) of dibenzoyl peroxide added portionwise over a period of 3 hours and 45 minutes at 95° C. The reaction mixture was heated further and stirred at 95° C. for 15 hours and 15 minutes. Excess di-n-butyl phosphite and the decomposition products of the peroxide were topped off under a pressure of one millimeter and at a pot temperature of 133° C. The residue weighed 99.8 grams. This corresponds to a yield of 96.6 percent of the 1:1 adduct, di-n-butylphosphonosuccinic acid. This new composition contained 12.93 percent phosphorus (theory=10.0 percent).

*Example 29.—Maleic acid reacted with di-2-ethylhexyl phosphite in a 1:1 molar proportion in presence of di-t-butyl peroxide*

A solution of 37.8 grams (0.326 mole) of technical maleic acid in 99.75 grams (0.326 mole) of di-2-ethylhexyl phosphite was treated with 10 grams (0.0685 mole) of di-t-butyl peroxide over a period of 5 hours, at 130° C. The reaction product was topped at 165° C. pot temperature under 3.5 millimeters pressure, leaving 132.8 grams of residue. This represents a yield of 96.6 percent of the 1:1 adduct. The new composition contained 7.58 percent phosphorus (theory for the 1:1 adduct 7.34 percent).

*Example 30.—Maleic anhydride reacted with di-n-butyl phosphite in a 1:3 molar proportion in presence of dibenzoyl peroxide*

A solution of 49 grams (0.5 mole) of maleic anhydride in 291 grams (1.5 moles) of di-n-butyl phosphite was treated with 4 grams (0.0165 mole) of dibenzoyl peroxide added in a stepwise manner over a period of 2.5 hours, while maintaining the reaction mixture at 85–90° C. Stirring and heating were continued for an additional 15.5 hours. Unreacted maleic anhydride, di-n-butyl phosphite, and decomposition products of dibenzoyl peroxide were removed at a pot temperature of 175° C., under a pressure of one millimeter. The residue, weighing 105.7 grams, represents a yield of 72.4 percent of the 1:1 adduct. This new product had a phosphorus content of 11.6 (theory for $C_{12}H_{21}O_6P$=10.6 percent).

*Example 31.—Diethyl maleate reacted with diethyl phosphite in a 1:4 molar proportion in the presence of di-t-butyl peroxide*

A solution of 43 grams (0.25 mole) of diethyl maleate in 138 grams (1 mole) of diethylphosphite was heated and stirred at 131–133° C. for 19 hours. During the first two hours, 8 grams (0.0548 mole) of di-t-butyl peroxide were added portionwise. The reaction mixture was then topped to remove excess diethyl phosphite by subjecting it to distillation under 4 millimeters pressure at a maximum pot temperature of 155° C. The residue weighed 72 grams, a yield of 93.2%. This product contained 10.97 percent phosphorus. The theoretical value for the 1:1 adduct, $C_{12}H_{23}O_7P$ is 10.0 percent.

*Example 32.—Ethyl acrylate reacted with di-n-butyl phosphite in a 1:10 molar proportion in the presence of dibenzoyl peroxide*

A mixture of 50 grams (0.5 mole) of ethyl acrylate, 970 grams (5.0 moles) of di-n-butyl phosphite, and 2 grams (0.0083 mole) of dibenzoyl peroxide was heated to 80–95° C. for two hours. Upon subjecting the reaction mass to distillation under 3 millimeters pressure at a liquid temperature of 130° C., a straw-colored oil was obtained which weighed 76.0 grams. The phosphorus content thereof, 7.12 percent, indicates that an average of about 2.4 molecules of ethyl acrylate were combined with each molecule of di-n-butyl phosphite.

*Example 33.—n-Butyl methacrylate reacted with di-n-butyl phosphite in a 1:2 molar proportion in the presence of di-t-butyl peroxide*

A solution of 71 grams (0.5 mole) of n-butyl methacrylate, 194 grams (1.0 mole) of di-n-butyl phosphite, and 2 grams (0.0137 mole) of di-t-butyl peroxide was heated slowly to 130° C. and maintained at that temperature for two hours. The unreacted phosphite and the decomposition products of the peroxide were removed under 4.5 millimeters pressure at a pot temperature of 194° C. The residue was a clear, tough, slightly tacky resin which weighed 65.6 grams. It contained 1.91 percent phosphorus. This analysis indicates that an average of about ten n-butyl methacrylate molecules were incorporated with each molecule of di-n-butyl phosphite.

*Example 34.—n-Butyl methacrylate reacted with di-n-butyl phosphite in a 1:10 molar proportion in the presence of di-t-butyl peroxide*

A solution of 71 grams (0.5 mole) of n-butyl methacrylate, 970 grams (5.0 moles) of di-n-butyl phosphite, and 2 grams (0.0137 mole) of di-t-butyl peroxide was heated to 135° C. and maintained at that temperature for two hours. Upon subjecting the reaction mass to distillation under 2.5 millimeters pressure to a maximum liquid temperature of 165° C., there was obtained a straw-colored, viscous oil which weighed 54.7 grams. The phosphorus content of 6.98 percent indicates that about two n-butyl methacrylate molecules were combined with one di-n-butyl phosphite molecule. Some 1:1 adduct of di-n-butyl phosphite and n-butyl methacrylate was also formed in this reaction. This adduct can be separated from the excess di-n-butyl phosphite by accurate fractionation.

*Example 35.—Crotonaldehyde reacted with di-n-butyl phosphite in a 1:3 molar proportion in the presence of dibenzoyl peroxide*

A solution of 35 grams (0.5 mole) of crotonaldehyde in 291 grams (1.5 moles) of di-n-butyl phosphite was heated at 82–92° C. for 6 hours. Six grams (0.0248 mole) of dibenzoyl peroxide were added portionwise during the first 3 hours of the reaction. The reaction product was topped to remove the excess di-n-butyl phosphite, unreacted crotonaldehyde, and dibenzoyl peroxide decomposition products. The residue weighed 136.3 grams. Part (133 grams) of the residue was subjected to distillation under three millimeters pressure. A distillate (I) boiling at 90–128° C. (132–205° C. pot temperature) weighing 69.9 grams was obtained. It contained 13.52 percent phosphorus (theory for 1:1 adduct is 11.79 percent). The residue was a hard, dark-brown solid weighing 59 grams and containing 17.7 percent phosphorus. The monomer product was probably present, in about 50 percent concentration, (I) along with di-n-butyl phosphite which was not eliminated by the topping operation. The new composition (I) gave a weak, but positive test for the aldehyde grouping.

*Example 36.—Acetylene reacted with di-n-butyl phosphite in presence of dibenzoyl peroxide*

Acetylene was bubbled through a solution of 5 grams (0.0206 mole) of dibenzoyl peroxide in 194 grams (1 mole) of di-n-butyl phosphite, while the temperature was slowly raised to 90° C. At this point, the temperature rose exothermally to 142° C. The reaction mixture was cooled and the procedure was repeated by adding another 5 grams (0.0206 mole) of dibenzoyl peroxide and bubbling acetylene through the mixture, while raising the temperature gradually to 90° C. Again, the temperature rose spontaneously to 142° C. Finally, another gram (0.0042 mole) of dibenzoyl peroxide was added while the reaction mixture was at a temperature of 85° C. A five-degree rise in temperature resulted. The total amount of peroxide used was 11 grams (0.0454 mole) and the maximum reaction time was 5 hours and 30 minutes. The reaction product was topped at a pot temperature of 168° C., under 1.5 millimeters pressure. The residue weighed 91 grams, but after the 11 grams of peroxide had been removed, 80 grams of the adduct were obtained. The reaction product contained 15.48 percent phosphorus (theory for bis-(dibutyl phosphono-)ethane=14.97 percent). The reaction may be postulated to proceed in accordance with the following equations:

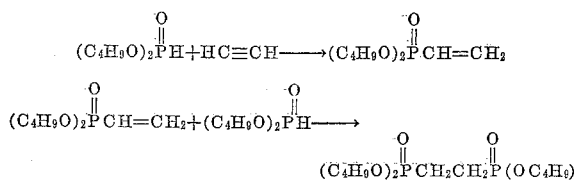

Under the conditions of this run, the bis-(dibutyl phosphono)-ethane is expected to be the only product. The vinyl phosphonate adds to a mole of dibutyl phosphite immediately on formation.

*Example 37.—Phenylacetylene reacted with di-n-butyl phosphite in a 1:6 molar proportion in the presence of di-t-butyl peroxide*

A solution of 51 grams (0.5 mole) of phenylacetylene in 582 grams (3.0 moles) of di-n-butyl phosphite was heated and stirred at 130–135° C. for 26.25 hours. Throughout the first 3 hours of reaction, 9 grams (0.0616 mole) of di-t-butyl peroxide were added. The unreacted materials were removed from the reaction product by distillation under 3 millimeters pressure at a maximum liquid temperature of 130° C. The residue, a viscous, red oil, weighed 81.4 grams and had a phosphorus content of 10.35 percent. This figure corresponds closely to the theoretical value for the mono-adduct (10.47 percent), rather than with the di-adduct (12.65 percent). The product can be the mono-adduct which then polymerized. Based on the mono-adduct, the residue weight represented a yield of 55 percent.

*Example 38.—Styrene reacted with di-n-butyl phosphite in molar proportions of 1:10 to 4:1 in presence of di-t-butyl peroxide*

In each run, a styrene-di-n-butyl phosphite solution was heated to 135° C. and 6 grams (0.041 mole) of di-t-butyl peroxide were added portionwise during the first three hours of reaction. The reaction mixture was then heated and stirred for an additional 15 hours at 135° C. Unreacted di-n-butyl phosphite and decomposition products of the peroxide were topped off under 1-2 millimeters pressure with a final pot temperature of about 150° C. The pertinent data for four such runs are set forth in Table III.

TABLE III

| Run | Styrene | | Di-n-butyl phosphite | | Molar Ratio, Styrene/DBP [1] | Wt. Residue, Grams | Phosphorus Content, Percent |
|---|---|---|---|---|---|---|---|
| | Grams | Moles | Grams | Moles | | | |
| A | 52 | 0.5 | 970 | 5.0 | 1:10 | 95.8 | 10.55 |
| B | 52 | 0.5 | 291 | 1.5 | 1:3 | 93.0 | 7.63 |
| C | 52 | 0.5 | 97 | 0.5 | 1:1 | 77.8 | 6.01 |
| D | 104 | 1.0 | 49 | 0.25 | 4:1 | 128.0 | 3.26 |

[1] Di-n-butyl phosphite.

The reaction involved herein may be represented by the equation:

$C_6H_5CH=CH_2+HP(O)(OC_4H_9)_2 \longrightarrow$

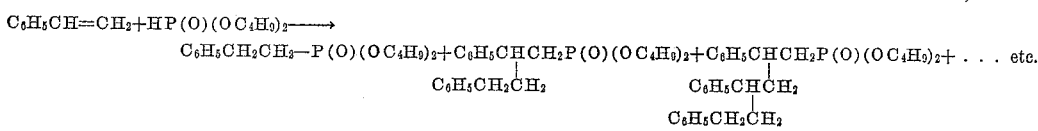

Other polymeric products of a higher degree of polymerization than shown may be formed, dependent somewhat on the amount of styrene used.

For reference purposes, the calculated weights of product and calculated phosphorus-contents to be expected from the reaction of styrene and di-n-butyl phosphite, in various molar ratios, are set forth in Table IV.

TABLE IV

| Molar Ratio, Styrene/DBP [1] | Grams Product for 0.5 mole styrene used | Calculated, Percent Phosphorus |
|---|---|---|
| 1:1 | 149 | 10.4 |
| 2:1 | 100.5 | 7.7 |
| 3:1 | 84.5 | 6.1 |
| 4:1 | 76.2 | 5.1 |
| 5:1 | 71.4 | 4.3 |
| 6:1 | 68.1 | 3.8 |
| 7:1 | 65.8 | 3.4 |
| 8:1 | 64.1 | 3.0 |
| 9:1 | 62.8 | 2.7 |
| 10:1 | 61.7 | 2.5 |

[1] Di-n-butyl phosphite.

Two occurrences operate to make the practical results deviate from the theoretical, calculated results. Firstly, the 1:1 adduct which is formed distills with the excess di-n-butyl phosphite, under the crude topping conditions employed. Accordingly, for a given phosphorus content, the weight of residue will be low, or, for a given residue weight, the phosphorus content will appear high. Secondly, a side reaction occurs in which the 1:1 adduct is dimerized. Thus, there is obtained a residue in run A which has the theoretical phosphorus content of the distillable 1:1 adduct. The residues from runs A and B, while of approximately the same weight, differ in physical properties as well as in phosphorus content. The aforementioned occurrences are less pronounced under conditions wherein a minimum of 1:1 adduct is expected (runs C and D). It must be noted, however, that, whereas certain reaction products, such as those from runs C and D, closely approximate the calculated yield and phosphorus content of products of definite molar ratios, these are not pure compounds of a definite nature. Rather, they are mixtures of many compounds of varying compositions as indicated by the equation set forth hereinbefore. This will be apparent from the nature and mechanism of the reaction involved.

Yields of pure 1:1 styrene-di-n-butyl phosphite adduct are obtained by using a dilute solution of styrene in di-n-butyl phosphite (as in run A), employing less peroxide, and running the reaction for a shorter period of time. The 1:1 adduct is readily separated from excess di-n-butyl phosphite by careful fractionation.

*Example 39.—Decene dimer reacted with di-n-butyl phosphite in a 1:3 molar proportion in the presence of di-t-butyl peroxide*

A solution of 761 grams (2 "effective" moles) of decene-1 dimer dissolved in 1164 grams (6 moles) of di-n-butyl phosphite was heated and stirred at 135° C. for 30 hours, with the addition of di-t-butyl peroxide in 5-gram portions during the reaction period. (The decene-1 dimer used herein had a boiling range of 607–645° F., an average molecular weight of 235, and a Norwood bromine number of 42.0. The material appeared to be about 76.3 percent olefin.) The reaction mass was subjected to distillation under 0.7 millimeter pressure at a maximum vapor temperature of 130° C. and a maximum pot temperature of 190° C. The residue, a viscous, yellow oil, weighed 838 grams. It contained 6.24 percent phosphorus. The theoretical phosphorus content for $C_{20}H_{41}P(O)(OC_4H_9)_2$ is 6.54 percent.

*Example 40.—Decene-1 polymer reacted with di-n-butyl phosphite in presence of di-t-butyl peroxide*

A solution of 100 grams of di-n-butyl phosphite in 200 grams of a thermal polymer of decene-1 (I) of light lubricating oil viscosity (containing olefins and paraffins of about $C_{30}$ to $C_{40}$) was heated and stirred at 135° C. for six hours. During the first three hours of the reaction, 5 grams (0.0342 mole) of di-t-butyl peroxide were added portionwise. The unreacted phosphite and the peroxide decomposition products were topped off at 155° C. liquid temperature, under 3 millimeters pressure, leaving an oily residue (II) of 222.9 grams. Analyses and physical properties of the decene-1 polymer (I) and the adduct thereof with di-n-butyl phosphite (II) are set forth in Table V.

TABLE V

| Material | Kinematic Viscosity | | Viscosity Index | Pour Point, °F. | Bromine Number | Phosphorus, Percent |
|---|---|---|---|---|---|---|
| | 100° F. | 210° F. | | | | |
| I | 22.69 | 4.59 | 134.6 | +25 | 18.8 | |
| II | 28.31 | 5.39 | 136.5 | +20 | 0.1 | 2.43 |

*Example 41.—Cyclohexene reacted with di-n-butyl phosphite in a 1:3 molar proportion in presence of dibenzoyl peroxide*

A solution of 41 grams (0.5 mole) of cyclohexene in 291 grams (1.5 moles) of di-n-butyl phosphite was heated and stirred at 85° C. for 6 hours. Six grams (0.0248 mole) of dibenzoyl peroxide were added stepwise during the first two hours of the reaction. The reaction mass was then subjected to distillation under one millimeter pressure. After removal of unreacted di-n-butyl phosphite and the decomposition products of dibenzoyl peroxide, a cut (I) weighing 95.4 grams was taken which boiled between 82° C. and 136°C. vapor temperature at a liquid temperature of 155–179° C. A viscous, yellow oil (II) weighing 23.9 grams remained as the residue. Cut (I) represents a yield of 69.1 percent of the 1:1 adduct, di-n-butyl cyclohexanephosphonate, and it contained 11.0 percent phosphorus (theory =11.2 percent). Cut (II) represents a yield of 17.3 percent of polymeric substances containing 12.3 percent phosphorus. These are new compositions of matter.

*Example 42.—α-Pinene reacted with di-n-butyl phosphite in a 1:3 molar proportion in the presence of dibenzoyl peroxide*

A solution of 68.1 grams (0.5 mole) of α-pinene in 291 grams (1.5 moles) of di-n-butyl phosphite was heated and stirred for 6 hours at 85–90° C. During the first two hours of reaction, 6 grams (0.0248 mole) of dibenzoyl were added in small portions. The reaction product was then topped to remove excess di-n-butyl phosphite and decomposition products of dibenzoyl peroxide. Upon distilling the remaining crude product under one millimeter pressure, a cut (I) weighing 66.8 grams and boiling between 110° C. and 130° C. (150–208° C. pot temperature) was collected. A viscous, yellow oil (II) remained as the residue. Cut (I) was di-n-butyl pinanephosphonate (Yield of 40.4 percent). It contained 9.13 percent phosphorus (theory=9.39 percent). The residue (II) was considered to be a mixture of higher polymeric materials (18.8 percent yield). It contained 11.9 percent phosphorus. These are believed to be new compositions of matter.

*Example 43.—Dipentene reacted with di-n-butyl phosphite in the presence of dibenzoyl peroxide*

A solution of 220 grams of commercial dipentene and 1164 grams (6 moles) of di-n-butyl phosphite was heated and stirred for 37 hours at 85° C. During the first 21 hours of reaction, 17 grams (0.0703 mole) of dibenzoyl peroxide were added in a portionwise manner. The commercial dipentene used had the following composition:

| Component: | Mole percent |
|---|---|
| Dipentene | 44 |
| p-Cymene | 16 |
| Carvomenthene | 13 |
| Terpinolene | 10 |
| Cis-p-menthane | 6 |
| α-Pinene | 3 |
| Pinane | 3 |
| β-Pinene | 2 |
| Tricyclene | 2 |
| Camphene | 0.3 |
| Total | 99.3 |

The reaction mass was subjected to distillation under 3 millimeters pressure. After separating a large forerun which consisted predominately of unreacted or saturated elements of the commercial dipentene and excess di-n-butyl phosphite, three higher-boiling cuts and a residue were isolated. A portion of the residue was water-washed. Pertinent data for these products are set forth in Table VI. The last two cuts and the residue appear to be relatively pure products, whereas the first cut is contaminated with di-n-butyl phosphite.

TABLE VI

| Temperature, °C. | | Pressure, mm. | Weight, g. | Percent P |
|---|---|---|---|---|
| Vapor | Liquid | | | |
| 100–110 | 125–140 | 3 | 34.8 | 13.93 |
| 110–121 | 140–158 | 3 | 21.7 | 9.57 |
| 121–125 | 158–170 | 3 | 11.5 | 9.06 |
| Residue | | | 56.1 | 12.41 |
| Washed residue | | | | 9.14 |

The possible addition products of this reaction have the following theoretical phosphorus contents:

| Product | Percent P |
|---|---|
| dipentene, di-n-butylphosphite (mono-adduct) | 9.39 |
| dipentene, di-n-butylphosphite (di-adduct) | 11.83 |
| carvomenthene, di-n-butylphosphite | 9.34 |
| terpinolene, di-n-butylphosphite (mono-adduct) | 9.39 |
| terpinolene, di-n-butylphosphite (di-adduct) | 11.83 |
| α-pinene, di-n-butylphosphite | 9.39 |
| β-pinene, di-n-butylphosphite | 9.39 |
| camphene, di-n-butylphosphite | 9.39 |

Tricyclene, pinane, cis-p-menthane and p-cymene are not expected to react in accordance with the reaction of this invention.

*Example 44.—Isoprene reacted with di-n-butyl phosphite in a 1:3 molar proportion in the presence of di-t-butyl peroxide*

A solution of 68 grams (1 mole) of isoprene, 582 grams (3 moles) of di-n-butyl phosphite, and 12 grams (0.0822 mole) of di-t-butyl peroxide was heated in a rocking bomb for 12 hours at 135° C. The product was cooled and filtered. A rubbery, hard solid, containing 5.51 percent phosphorus, remained on the filter. It was not soluble in isopropyl alcohol or benzene.

*Example 45.—Dicyclopentadiene reacted with di-n-butyl phosphite in a 1:12 molar proportion in the presence of di-t-butyl peroxide*

A solution of 33 grams (0.25 mole) of dicyclopentadiene and 12 grams (0.0822 mole) of di-t-butyl peroxide in 582 grams (3 moles) of di-n-butyl phosphite was heated and agitated in a one-liter, stainless steel bomb for 12 hours at an average temperature of 135° C. The maximum pressure generated during the reaction was 100 pounds per square inch. The crude product was filtered, and then it was topped to a final pot temperature of 140° C. and a vapor temperature of 100° C. under 0.8 millimeter pressure, in order to remove excess di-n-butyl phosphite and the peroxide decomposition products.

The residue, which weighed 95.3 grams, was a dark brown, resinous material. By analysis it was shown to contain 11.12 percent phosphorus. The theoretical phosphorus content of the 1:1 addition product is 9.5 percent, and of the 2:1 addition product of di-n-butyl phosphite with dicyclopentadiene is 11.9 percent. It is known that the depolymerization of dicyclopentadiene occurs readily. The theoretical phosphorus content of the 1:1 addition product of di-n-butyl phosphite with cyclopentadiene is also 11.9 percent, and of the 2:1 addition product is 13.7 percent.

*Example 46.—Allyl chloride reacted with di-n-butyl phosphite in a 1:3 molar proportion in the presence of dibenzoyl peroxide*

A solution of 76.5 grams (1 mole) of allyl chloride in 582 grams (3 moles) of di-n-butyl phosphite was heated and stirred at 84–85° C. for 21.66 hours, with 10 grams (0.0413 mole) of dibenzoyl peroxide being added during the first 4 hours. The reaction mass was subjected to distillation under 3 millimeters pressure, and two fractions and a residue were isolated. Pertinent data therefor are set forth in Table VII.

TABLE VII

| Temperature, °C. | | Pressure, mm. | Weight, g. | Percent P | Percent Cl |
|---|---|---|---|---|---|
| Vapor | Liquid | | | | |
| 109.5–125 | 147–185 | 3 | 38.4 | 10.61 | 8.92 |
| above 125 [1] | above 185 [1] | 3 | 14.5 | 10.39 | 11.96 |
| Residue | | | 73.0 | 8.87 | 21.07 |
| Theory for ClCH$_2$CH$_2$CH$_2$P(O)(OC$_4$H$_9$)$_2$ | | | | 11.48 | 13.13 |
| Theory for C$_6$H$_{11}$Cl$_2$P(O)(OC$_4$H$_9$)$_2$ | | | | 8.94 | 20.45 |

[1] The distillation apparatus was so constructed that vapor temperatures of 125–150° C. and liquid temperatures of 185–210° C. were not readable.

*Example 47.—Trichloroethylene reacted with di-n-butyl phosphite in a 1:3 molar proportion in the presence of dibenzoyl peroxide*

A solution of 65.7 grams (0.5 mole) of trichloroethylene in 291 grams (1.5 moles) of di-n-butyl phosphite was heated for 9 hours at 85° C. During the first three hours of reaction, 8 grams (0.033 mole) of dibenzoyl peroxide were added portionwise. The crude reaction product was subjected to distillation under 2 millimeters pressure. A 28.4-gram fraction (I) was collected which boiled at 102–118° C. vapor temperature and 136–155° C. liquid temperature. The residue (II) weighed 50.5 grams. Distillate (I) contained 11.97 percent phosphorus and 7.00 percent chlorine. The residue contained 15.04 percent phosphorus and 18.55 percent chlorine. The calculated values for C$_{10}$H$_{20}$O$_3$PCl$_3$ are 9.52 percent phosphorus and 32.4 percent chlorine.

*Example 48.—Vinyl isobutyl ether reacted with di-n-butyl phosphite in a 1:3 molar proportion in the presence of dibenzoyl peroxide*

A solution of 20 grams (0.2 mole) of vinyl isobutyl ether in 120 grams (0.618 mole) of di-n-butyl phosphite was heated and stirred at 83–84° C. for 20.5 hours. Six grams (0.0248 mole) of dibenzoyl peroxide were added portionwise, during the first three hours. The reaction mass was then subjected to distillation at 3 millimeters pressure, and two higher boiling cuts were taken. Only the last distillate and the residue are considered to be products of the reaction. Pertinent data on the fractions are set forth in Table VIII. The theoretical phosphorus content for C$_4$H$_9$OCH$_2$CH$_2$P(O)(OC$_4$H$_9$)$_2$ is 10.54 percent.

TABLE VIII

| Vapor Temp., °C. | Liquid Temp., °C. | Pressure, mm. | Weight, g. | Phosphorus, Percent |
|---|---|---|---|---|
| 98–125 | 100–158 | 3 | 71.6 | 15.63 |
| 125–125.5 | 158–163 | 3 | 7.8 | 11.08 |
| Residue | | | 19.5 | 9.45 |

*Example 49.—Diallyl ether reacted with di-n-butyl phosphite in a 1:4 molar proportion in the presence of dibenzoyl peroxide*

A solution of 49 grams (0.5 mole) of diallyl ether in 388 grams (2 moles) of di-n-butyl phosphite was heated and stirred at 80–85° C. for 26.33 hours. During the first 2.42 hours of reaction, 8 grams (0.0331 mole) of dibenzoyl peroxide were added, stepwise. Unreacted materials were removed by subjecting the reaction mixture to distillation under 3–4 millimeters pressure at a maximum liquid temperature of 158° C. and a maximum vapor temperature of 114° C. The residue was a light tan oil, weighing 117.4 grams. It contained 10.08 percent phosphorus. The theoretical phosphorus contents for O[CH$_2$CH$_2$CH$_2$P(O)(OC$_4$H$_9$)$_2$]$_2$ and for

O[CH$_2$CH=CH$_2$][CH$_2$CH$_2$CH$_2$P(O)(OC$_4$H$_9$)$_2$]

are 12.75 percent and 10.62 percent, respectively.

*Example 50.—Diallyl sulfide reacted with di-n-butyl phosphite in a 1:6 molar proportion in the presence of di-t-butyl peroxide*

A solution of 16 grams (0.14 mole) of diallyl sulfide in 163 grams (0.84 mole) of di-n-butyl phosphite was heated and stirred at about 135° C. for 22.33 hours. During the first 2 hours, 6 grams (0.0411 mole) of di-t-butyl peroxide were added portionwise. The reaction mass was topped under 3–4.5 millimeters pressure to a maximum pot temperature of 134° C. The residue was a dark red liquid, weighing 67.1 grams. It contained 14.54 percent phosphorus and 4.85 percent sulfur. A portion of the crude residue was water-washed. The washed residue contained 12.99 percent phosphorus and 5.79 percent sulfur. The calculated values for the 2:1 adduct, S[CH$_2$CH$_2$CH$_2$P(O)(OC$_4$H$_9$)$_2$]$_2$, are 12.33 percent phosphorus and 6.38 percent sulfur; and for the 1:1 adduct, S[CH$_2$CH=CH$_2$][CH$_2$CH$_2$CH$_2$P(O)(OC$_4$H$_9$)$_2$], are 10.06 percent phosphorus and 10.4 percent sulfur.

*Example 51.—Mesityl oxide reacted with di-n-butyl phosphite in a 1:3 molar proportion in the presence of di-t-butyl peroxide*

A solution of 49.1 grams (0.5 mole) of mesityl oxide in 291 grams (1.5 moles) of di-n-butyl phosphite was heated and stirred at 133–135° C. for 20.5 hours. During the first two hours of the reaction, 6 grams (0.0411 mole) of dibenzoyl peroxide were added portionwise. The reaction mass was subjected to distillation under 3 millimeters pressure, and two higher boiling cuts were taken. The highest boiling distillate has a phosphorus content approximately equal to that expected is one molecule of di-n-butyl phosphite had also added to the ketone group. Such a product, however, would boil at a much higher temperature than the fraction in question. Accordingly, it is believed that the high phosphorus content is due to di-n-butyl phosphite contamination. The residue product appears to be partially hydrolyzed. The calculated phosphorus content for the 1:1 adduct, $(CH_3)_2CH—CH[P(O)(OC_4H_9)_2]C(O)CH_3$, is 10.61 percent. Pertinent data on the fractions and the residue are set forth in Table IX.

TABLE IX

| Distillation Conditions | | Analyses | | |
| --- | --- | --- | --- | --- |
| Temperature, °C. | | Pressure, mm. | Weight, g. | Percent P | Potentiometric Neutr. Number |
| Vapor | Liquid | | | | |
| 101–112 | 141–155 | 3 | 27.8 | 14.06 | |
| 112 | 155–178 | 3 | 33.3 | 12.77 | |
| Residue | | | 95.7 | 16.15 | 200.0+243.7 |

*Example 52.—Didecenyl ketone reacted with di-n-butyl phosphite in a 1:6 molar proportion in the presence of di-t-butyl peroxide*

A solution of 76.5 grams (0.25 mole) of didecenyl ketone in 291.0 grams (1.5 moles) of di-n-butyl phosphite was heated and stirred at 128–135° C. for 27.66 hours, with 10 grams (0.0685 mole) of di-t-butyl peroxide being added stepwise during the first 3 hours. The reaction mass was subjected to distillation under 3 millimeters pressure at a maximum liquid temperature of about 180° C. The residue, a viscous, yellow oil, weighed 212.8 grams. This weight indicates that 3 moles of di-n-butyl phosphite entered into the reaction with each mole of didecenyl ketone, probably through a side reaction with the carbonyl grouping. The crude residue contained 11.52 percent phosphorus. A portion of the residue which was water-washed contained 11.02 percent phosphorus. The theoretical phosphorus content for $O=C[C_{10}H_{20}P(O)(OC_4H_9)_2]_2$ is 8.94 percent. The calculated value for the product in which the carbonyl group has added is 10.5 percent phosphorus.

*Example 53.—Armeen SD reacted with di-n-butyl phosphite in a 1:3 molar proportion in the presence of di-t-butyl peroxide*

A solution of 89 grams (approximately 0.33 mole) of Armeen SD in 194 grams (1 mole) of di-n-butyl phosphite was heated for 20 hours at 133–135° C. During the first three hours, 8 grams (0.0548 mole) of di-t-butyl peroxide were added portionwise. (Armeen SD is a commercial mixture of primary aliphatic amines derived from soy bean oil. According to the manufacturer, Armour and Company, it contains 10 percent hexadecylamine, 10 percent octadecylamine, 35 percent octadecenylamine, and 45 percent octadecadienylamine.) The reaction product was freed of excess di-n-butyl phosphite by subjecting the reaction mass to distillation under 3 millimeters pressure. The residue weighed 169 grams. The expected weight of the residue if all the double bonds present had added di-n-butyl phosphite is 169.7 grams. This residue contained 8.57 percent phosphorus and 2.55 percent nitrogen. The calculated values therefor are 7.63 percent and 2.76 percent, respectively.

*Example 54.—Armid RO reacted with di-n-butyl phosphite in a 1:3 molar ratio in the presence of di-t-butyl peroxide*

A solution of 90.3 grams (approximately 0.32 mole) of Armid RO in 194 grams (1 mole) of di-n-butyl phosphite was heated for 19 hours at 133–135° C., with 8 grams (0.0548 mole) of di-t-butyl peroxide being added portionwise during the first 3 hours. The product was topped free of excess di-n-butyl phosphite by subjecting the reaction mass to distillation under 3 millimeters pressure. The residue weighed 161.0 grams. The expected weight of residue, based on the manufacturer's specifications of unsaturation in the amide, is 158.6 grams, if all of the double bonds react with di-n-butyl phosphite. The product contained 8.15 percent phosphorus and 2.43 percent nitrogen. The calculated values are 7.03 percent phosphorus and 2.77 percent nitrogen.

According to the manufacturer, Armour and Company, Armid RO is composed of 20 percent octadecanoic acid amide, 60 percent octadecenoic acid amide, and 20 percent octadecadienoic acid amide.

*Example 55.—Acrylonitrile reacted with di-n-butyl phosphite in a 1:2 molar proportion in the presence of dibenzoyl peroxide*

A mixture of 53 grams (1.0 mole) of acrylonitrile, 388 grams (2.0 moles) of di-n-butyl phosphite, and 2 grams (0.0083 mole) of dibenzoyl peroxide was heated slowly to 85° C. At this temperature, there was a spontaneous temperature increase to 104° C. The solution became cloudy, due to the presence of a finely-divided, cream-colored solid. The reaction mass was cooled to 95° C., and further heated and stirred at 85–95° C. until a total time of six hours had elapsed. The cream-colored solid was filtered off and washed off of di-n-butyl phosphite with n-hexane. The dried solid thus obtained weighed 67.0 grams. It contained 5.54 percent phosphorus and 17.2 percent nitrogen. These analytical data indicate that the product comprised an average of about seven moles of acrylonitrile per mole of di-n-butyl phosphite.

*Example 56.—Dodecene-1 reacted with orthophosphorous acid in a 1:1 molar proportion in presence of dibenzoyl peroxide, using dioxane as a mutual solvent*

A mixture of 84 grams (0.5 mole) of dodecene-1, 41 grams (0.5 mole) of crystalline orthophosphorous acid, and 200 grams of dioxane were heated and stirred at 85° C. for 21 hours. During the first two hours of the reaction, 10 grams (0.0414 mole) of dibenzoyl peroxide were added portionwise. Dioxane and the decomposition products of benzoyl peroxide were then removed by distillation under reduced pressure. The solid residue was dissolved in diethyl ether, and the solution was washed with water to remove unreacted orthophosphorous acid. The ether was evaporated, leaving a crystalline solid. This was recrystallized from n-hexane to yield 32.1 grams of white platelets (I) which melted at 98–98.5° C. (uncorrected). The filtrates from the recrystallizations were evaporated to dryness, leaving 66 grams of a crystalline solid (II). The product (I) was pure n-dodecanephosphonic acid (a yield of 25.7 percent). It contained 12.4 percent phosphorous (theory=12.4 percent) and had a neutralization number of 420.5 (theory is 448.8). The residue (II) was additional crude n-dodecanephosphonic acid (a yield of 52.8 percent).

*Example 57.—Dodecene-1 reacted with orthophosphorous acid in a 1:1 molar proportion in presence of dibenzoyl peroxide, using butanol-1 as a mutual solvent*

A solution of 84 grams (0.5 mole) of dodecene-1 and 41 grams (0.5 mole) of crystalline orthophosphorous acid in 200 grams of butanol-1 were heated and stirred at 85° C. for 21 hours. Ten grams (0.0414 mole) of dibenzoyl peroxide were added in small portions throughout the first 4 hours of the reaction period. Most of the butanol was removed along with the decomposition products of dibenzoyl peroxide under reduced pressure, leaving an oily residue weighing 150 grams. Fifty grams of this residue were refluxed with 100 cubic centimeters of concentrated hydrochloric acid, for 24 hours, to convert any butyl ester, which may have formed, to the free acid. An oily layer was separated from the aqueous layer, dissolved in diethyl ether, and washed with water. Upon removal of the ether, a crystalline residue was obtained. This was recrystallized from n-hexane several times and 5 grams of pure n-dodecanephosphonic acid crystals melting at 98.5–99.0° C. (uncorrected) were obtained. The pure product contained 12.02 percent phosphorus (theory=12.4 percent) and had a neutralization number of 457.0 (calculated value is 448.8).

*Example 58.—Reaction of α-pinene, orthophosphorous acid, and n-amyl alcohol in a 1:2:4.5 molar proportion in the presence of di-t-butyl peroxide*

A mixture of 68 grams (0.5 mole) of α-pinene, 82 grams (1.0 mole) of crystalline orthophosphorous acid, and 200 grams (2.27 moles) of n-amyl alcohol was heated in a reaction vessel provided with a side-arm water take-off trap. A total of 17 grams of water was taken off in the side-arm separator along with 34.9 grams of n-amyl alcohol at a maximum reaction temperature of 135° C. The side-arm water take-off trap was then removed from the system, 2 grams (0.0137 mole) of di-t-butyl peroxide were added, and the contents of the reactor were heated and stirred at 135° C. for 16 hours. Then during the first two hours of an additional three hours of reaction, an additional 6 grams (0.0411 mole) of di-t-butyl peroxide were added. The reaction mixture was then topped at 115° C. under 4 millimeters pressure. The residue was taken up in ether and water-washed to remove unreacted orthophosphorous acid. The solvents were removed by topping at 133° C. under 3 millimeters pressure, leaving a residue weighing 115.6 grams. This residue contained 14.80 percent phosphorus and it had a potentiometric neutralization number of 245. The theoretical values for $$C_{10}H_{17}P(O)(OH)(OC_5H_{11})$$

and $C_5H_{11}OPHO(OH)$ are 10.77 percent and 20.4 percent phosphorus, respectively, and neutralization numbers of 195 and 369, respectively. The analysis indicates that the product is a mixture of about 58.2 percent by weight of mono-n-amyl α-pinanephosphonate and about 41.8 percent by weight of mono-n-amyl phosphite. A mixture of this composition contains 14.8 percent phosphorus and has a neutralization number of 267.8.

*Example 59.—Undecylenic acid reacted with orthophosphorous acid in a 1:1 molar proportion in the presence of dibenzoyl peroxide, using dioxane as a mutual solvent*

A mixture of 184.27 grams (1 mole) of undecylenic acid, 84 grams (1 mole) of crystalline orthophosphorous acid, and 400 grams of dioxane was heated and stirred at 85–90° C. for 24 hours. During the first five hours, 12 grams (0.0496 mole) of dibenzoyl peroxide were added portionwise. The dioxane and the unreacted undecylenic acid were removed by vacuum distillation, and the residue therefrom was poured into water. A white solid separated from the aqueous layer. It was isolated by filtration. A small portion was recrystallized from ethanol. The first crystallization produced 4 grams of a white solid (I), which melted at 175–181° C. Upon recrystallizing it from ethanol, there were obtained 1.5 grams of a purer sample (II), melting at 179–183° C. Sample (II) contained 10.40 percent phosphorus. The theoretical phosphorus content of $C_{11}H_{23}O_5P$ is 11.61.

REACTIONS OF PHOSPHORUS COMPOUNDS HAVING TWO P—H LINKAGES

*Example 60.—2-ethylhexene-1 reacted with hypophosphorus acid in a 3:1 molar proportion in the presence of dibenzoyl peroxide, using dioxane as a mutual solvent*

A mixture of 336 grams (3 moles) of 2-ethylhexene-1, 132 grams (about 1 mole) of 50-percent hypophosphorous acid, and 500 cubic centimeters of dioxane was heated to 85° C. for 22.5 hours, 12 grams (0.0496 mole) of dibenzoyl peroxide being added portionwise during this period of time. Upon cooling and filtering the reaction mixture, 15.5 grams of a white solid were obtained. Further investigation showed that this was calcium hypophosphite, an impurity in the commercial hypophosphorous acid. The excess reactants and the solvent were removed by distillation. The residue was taken up in ether, and water-washed to remove unreacted hypophosphorous acid. Upon removing the ether and other volatile materials by subjecting the solution to distillation under 3–4 millimeters pressure, a residue weighing 189.2 grams was obtained. It contained 13.58 percent phosphorus and had a neutralization number of 256.5. The calculated values for di-(2-ethylhexyl)phosphinic acid and for 2-ethylhexylhydroxyphosphine oxide are 10.68 percent and 17.41 percent phosphorus, respectively, and neutralization numbers of 193.4 and 315.1, respectively. Therefore, the residue appears to be a mixture of the two possible products of the reaction.

*Example 61.—Dodecene-1 reacted with hypophosphorous acid in a 1:1 molar proportion in presence of dibenzoyl peroxide, using butanol-1 as a solvent*

A solution of 84 grams (0.5 mole) of dodecene-1 and 66 grams (0.5 mole) of a 50 percent aqueous solution of hypophosphrous acid in 200 grams of butanol-1 were heated and stirred for 22.5 hours at 84° C. Ten grams (0.0414 mole) of dibenzoyl peroxide were added portionwise during the first four hours of the reaction period. The reaction vessel contained a large amount of white solid which was insoluble in the mother liquor. This solid was separated by filtration and dried. The 63 grams of product, which proved to be predominantly di-n-dodecylphosphinic acid, represents a 62.6 percent yield. A small portion of the crystals was recrystallized from ethanol and then from n-hexane to produce a sample for identification purposes. This sample melted at 92–92.5° C., contained 7.66 percent phosphorus [theory for $(C_{12}H_{25})_2POOH=7.72$ percent and for $$(C_{12}H_{25}(H)POOH=13.25$$

percent], and had a neutralization number of 139.7 [theory for $(C_{12}H_{25})_2POOH=139.4$ and for $$(C_{12}H_{25})(H)POOH=239.5]$$

When the crude product was treated with alcohol for recrystallization purposes, a white powder was left behind. This solid did not dissolve in alcohol, even under repeated extractions with hot alcohol. It was also insoluble in diethyl ether, n-hexane, aqueous caustic solutions, and water. The white solid melted indefinitely between 198° C. and 242° C. It contained 12.88 percent phosphorus and had a neutralization number of zero. It was discovered, however, that the 50-percent hypophosphorous acid reactant contained appreciable amounts of calcium hypophosphite as an impurity. Accordingly, it was apparent that the white powder was the 1:1 addition product of calcium hypophosphite and dodecene-1, $C_{12}H_{25}(H)P(O)OCaO(O)P(H)C_{12}H_{25}$, which contains 12.25 percent phosphorus. Therefore, it will be seen that the use of a salt of hypophosphorous acid, which will form a mono-addition product insoluble in the reaction mixture, affords a means of stopping the addition reaction to hypophosphorous acid at the mono-addition stage. The pure acid can be recovered by careful acidification of the salt of the mono-addition product.

*Example 62*

For comparison purposes, a run was made using 84 grams (0.5 mole) of dodecene-1 and 66 grams (0.5 mole) of a 50 percent aqueous solution of hypophosphorous acid, but using no source of free radicals, such as dibenzoyl peroxide, as was used in the preceding example. These reactants were heated at 55° C. in accordance with the conditions proposed for the addition of hypophosphorous acid to aldehydes or ketones (see U.S. Patent No. 2,370,903). Under these conditions, no reaction occurred.

This run shows conclusively that some source of free radical activation is necessary in the reaction of the present invention and that the reaction does not involve the relatively spontaneous addition encountered in the case of aldehydes and ketones.

*Example 63.—Dodecene-1 reacted with hypophosphorous acid in a 1:1 molar proportion in presence of hydrogen peroxide and ferrous sulfate, using butanol-1 as the mutual solvent*

A mixture of 84 grams (0.5 mole) of dodecene-1, 66 grams (0.5 mole) of 50 percent aqueous solution of hypophosphorous acid, 100 grams of butanol-1, and one gram of ferrous sulfate was heated and stirred at 85° C. for 6 hours. Eight grams (0.088 mole) of 30 percent hydrogen peroxide were added portionwise during the first three hours of the reaction period. The reaction mass was filtered to remove a small amount of inorganic matter, and topped to remove solvents and unreacted dodecene-1. The residue was taken up in diethyl ether and washed with water to remove unreacted hypophosphorous acid. After removal of the ether, 13 grams of a crystalline solid remained. This represents a yield of 11.1 percent of crude n-dodecylhydroxyphosphine oxide, as shown by subsequent analyses. Recrystallization of the crude product from ethanol and from n-hexane gave a product melting at 45–50° C. The substance contained 12.95 percent phosphorus [theory for $$(C_{12}H_{25})(H)POOH = 13.25$$

percent and for $(C_{12}H_{25})_2POOH = 7.72$ percent] and had a neutralization number of 232.0 [calculated value for $(C_{12}H_{25})(H)POOH = 239.5$ and for $$C_{12}H_{25})_2POOH = 139.5$$

*Example 64.—Dodecene-1 reacted with hypophosphorous acid in a 1:1 molar proportion in presence of dibenzoyl peroxide, using dioxane as a mutual solvent*

A mixture of 84 grams (0.5 mole) of dodecene-1, 66 grams (0.5 mole) of a 50 percent aqueous solution of hypophosphorous acid, and 200 grams of dioxane was heated and stirred for 22 hours at 85° C. Ten grams (0.0414 mole) of dibenzoyl peroxide were added in small portions throughout the first 4 hours of the reaction period. Upon cooling the reaction mass, a large amount of a white solid precipitated. After separating and drying, this solid weighed 72 grams, representing a yield of 71.6 percent of crude di-n-dodecylphosphinic acid (as shown by subsequent analyses). A portion of the crude product was extracted with ethanol at room temperature and then recrystallized twice from n-hexane. This procedure afforded a product melting at 90–91.5° C., having 7.3 percent phosphorus [theory for $C_{12}H_{25})_2POOH$ is 7.72 percent], and a neutralization number of 144.1 [calculated value for $(C_{12}H_{25})_2POOH$ is 139.5].

*Example 65.—Octadecene-1 reacted with hypophosphorous acid in a 1:1 molar proportion in the presence of dibenzoyl peroxide, using dioxane as a mutual solvent*

A mixture of 1024 grams (4.05 moles) of octadecene-1, 528 grams (4 moles) of 50-percent aqueous hypophosphorous acid solution, and 996 grams of dioxane was heated and stirred at 85° C. for 30 hours, with 26 grams (0.107 mole) of dibenzoyl peroxide being added during this period. The reaction mixture was cooled to room temperature and filtered to produce a white cake. Dioxane and water were removed from the filtrate, and, upon cooling it to room temperature, a second white cake was obtained. The filtrate from this operation was further cooled in an ice bath and, upon filtration, a third white cake was obtained. Each cake was separated into an alcohol-soluble and an alcohol-insoluble portion. The latter operation afforded a rough separation of the alkyl- hydroxyphosphine oxides and the phosphinic acids, the alkylhydroxyphosphine oxides being much more soluble in alcohol than the phosphinic acids. Each of these six portions was repeatedly crystallized from n-hexane, the tailings from each recrystallization being saved and further purified. Finally, the many fractions arranged themselves into three classifications of crystals, viz., high melting point (96–105° C.) weighing 64 grams, intermediate melting point (65–68° C.) weighing 49.7 grams, and low melting point (44–45° C.) weighing 44.8 grams. Crude solid material recovered from tailings weighed 190 grams. A representative sample of each of the classes of crystals had the analysis set forth in Table X.

TABLE X

| Melting Point of Crystals | 103–105° C. | 65–68° C. | 44–45° C. |
|---|---|---|---|
| Percent Phosphorus: | | | |
| Found | 5.73 | 9.63 | 7.88 |
| Theory for (¹) | 5.44 | | 5.44 |
| Theory for (²) | | 9.75 | 9.75 |
| Potentiometric Titration, Neutralization Number: | | | |
| Found | ³ 78.7 | 145.2 | 56.5 |
| Theory for (¹) | 98.4 | | 98.4 |
| Theory for (²) | | 176.4 | 176.4 |
| Percent Active Hydrogen: | | | |
| Found | 0.177 | 0.382 | 0.126 |
| Theory for (¹) | 0.176 | | 0.176 |
| Theory for (²) | | 0.315 | 0.315 |

¹ $(C_{18}H_{37})_2PO(OH)$. 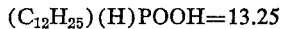
² $C_{18}H_{37}PHO(OH)$. 
³ Sample not completely soluble in titration medium.

*Example 66.—Cyclohexene reacted with hypophosphorous acid in a 1:1 molar proportion in the presence of dibenzoyl peroxide, using dioxane as a mutual solvent*

A mixture of 656 grams (8 moles) of cyclohexene, 1056 grams (8 moles) of 50-percent hypophosphorous acid, and 1200 cubic centimeters of dioxane was heated and stirred at 80° C. for 27.5 hours, 36 grams (0.1488 mole) of dibenzoyl peroxide being added portionwise throughout the reaction period. A white inorganic solid was filtered off, and the major portion of the dioxane, water, and unreacted cyclohexene was removed by evaporation. The product residue was taken up in ether and water-washed to remove unreacted hypophosphorous acid. The ether was removed by evaporation, leaving 511.5 grams of a viscous, straw-colored liquid. This liquid contained 17.37 percent phosphorous and had a neutralization number of 340.5. The theoretical values for cyclohexylhydroxyphosphine oxide and for dicyclohexylphosphinic acid are 20.9 percent and 13.5 percent phosphorus, respectively, and neutralization numbers of 381 and 243, respectively. The analysis indicates that the liquid product is a mixture of the mono- and di-addition products.

*Example 67.—Oleic acid reacted with hypophosphorous acid in a 1:1 molar proportion in the presence of dibenzoyl peroxide, using dioxane as a mutual solvent*

A mixture of 282 grams (1 mole) of oleic acid, 132 grams (1 mole) of 50-percent hypophosphorous acid, and 400 grams of dioxane was stirred and heated at 85° C. for 51 hours. During this period, 29 grams (0.12 mole) of dibenzoyl peroxide were added portionwise. The reaction mass was then subjected to distillation at 10 millimeters pressure to a maximum liquid temperature of 80° C., to remove most of the dioxane. The residue was taken up in ether, and it was water-washed to remove unreacted hypophosphorous acid. The ether and any other volatile matter present were removed by topping the solution to a liquid temperature of 140° C. under 7 millimeters pressure. The residue from this operation weighed 327.6 grams. Pertinent analyses and calculated values for this residue are set forth in Table XI.

TABLE XI

|  | Found | Calculated for— | |
| --- | --- | --- | --- |
|  |  | [(COOH)(C₁₇H₃₄)]₂POOH | [(COOH)(C₁₇H₃₄)][H]POOH |
| Percent Phosphorus | 5.15 | 4.92 | 8.92 |
| Neutralization Number | 73.5+271.5 | 89.1+267.3 | 161.2+322.3 |
| Yield, g | 327.6 | 315 | 348 |
| Quantitative Hydrogenation, cc H₂/g | 11.0 |  |  |

The analyses indicate that the product is a mixture of the mono- and di-substituted hypophosphorous acid addition products, accompanied by some unreacted oleic acid.

REACTIONS OF PHOSPHORUS COMPOUNDS HAVING THREE P-H LINKAGES

*Example 68.—Octene-1 reacted with phosphine in the presence of ultraviolet light*

An undetermined amount of phosphine gas was bubbled rapidly into 224 grams (2 moles) of octene-1 for five minutes. During this reaction period, the octene-1 was agitated at room temperature, and ultraviolet light radiation was provided by a 4-watt U-shaped germicidal lamp extending partially below the surface of the olefin. After removing unreacted octene-1 by distillation means, a liquid residue weighing 5.8 grams was obtained. This residue contained 11.40 percent phosphorus (theory for dioctylphosphine is 12.02 percent).

The reaction involved herein probably proceeds in a stepwise manner, in accordance with the equations:

$$C_6H_{13}CH=CH_2+PH_3 \rightarrow C_6H_{13}CH_2CH_2PH_2$$

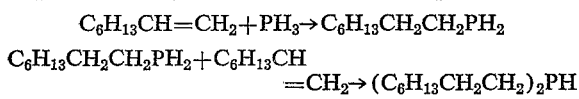

Exposure of the reaction mass to the catalytic influence of the ultraviolet light for a longer reaction time would have caused the following reaction to occur:

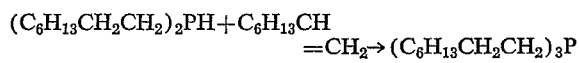

In view of the foregoing, it will be evident that a monoalkylphosphine will react with an olefin to form a dialkylphosphine, using ultraviolet light as a catalyst. In a similar fashion, a monoalkylphosphine will react with any unsaturated organic compound reactant as defined herein.

*Example 69.—Octene-1 reacted with phosphine in the presence of dibenzoyl peroxide*

An undetermined amount of phosphine gas was bubbled slowly into a mixture of 6 grams (0.0248 mole) of dibenzoyl peroxide and 224 grams (2 moles) of octene-1 for 24 hours at 80–85° C. On distilling off the unreacted materials at a maximum vapor temperature of 45° C. under 50 millimeters pressure, 19 grams of a slightly viscous, yellow oil were obtained as the residue. This oil was washed with a dilute aqueous solution of sodium carbonate and then with distilled water. The washed residue was dried by means of a benzene azeotropic distillation. Upon standing, a white, fluffy solid precipitated slowly from the product (9.2 grams). This solid was removed by filtration. It melted at 74–77° C. and it contained 8.79 percent phosphorus. The theoretical phosphorus content for trioctylphosphine is 8.38 percent. The viscous, oily filtrate contained 6.11 percent phosphorus.

The reaction involved probably proceeds in a stepwise manner, as outlined in the equations:

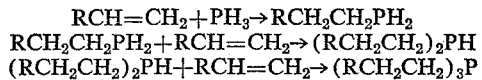

Thus it is apparent that a mono- or di-substituted phosphine can be used as the starting material for the production of a trisubstituted phosphine, in accordance with this invention. This example and the preceding example also demonstrate that mono-, di-, or tri-substituted phosphines can be produced from phosphine and an unsaturated organic compound reactant, depending on the reaction conditions and on the ratio of reactants involved.

COUPLING WITH REACTON AMOUNTS OF A FREE RADICAL CATALYST

The following examples illustrate the coupling action on monomeric reaction products which is induced by more than catalytic amounts of free radical-producing catalysts. It must be noted that some polymeric products of this type were obtained in the examples directed to the production of 1:1 addition products. As mentioned hereinbefore, the coupling action is favored by using larger amounts of catalyst.

*Example 70.—Coupling of di-n-butyl n-octanephosphonate molecules with reaction amounts of di-t-butyl peroxide*

A mixture of 102 grams (0.33 mole) of di-n-butyl n-octanephosphonate and 25 grams (0.17 mole) of di-t-butyl peroxide was heated for 6 hours at 127–132° C. The unreacted materials were separated from the multi-coupled phosphonates by subjecting the reaction mass to distillation under 3 millimeters pressure at a final liquid temperature of 199° C. The residue was a light yellow oil weighing 27.5 grams, which represents a yield of about 27 percent of coupled product. This product contained 9.60 percent phosphorus. It had kinematic viscosities of 59.27 centistokes at 100° F. and of 8.80 centistokes at 210° F., a viscosity index of 126, and a pour point of less than −30° F.

*Example 71.—Coupling of di-n-butyl n-octanephosphonate with reaction amounts of di-t-butyl peroxide*

A mixture of 61.5 grams (0.2 mole) of di-n-butyl n-octanephosphonate and 15 grams (0.106 mole) of di-t-butyl peroxide was heated and stirred at about 140° C. for six hours. During the heating period, a fractionating column was placed in a sidearm of the reactor to separate t-butyl alcohol as it was formed in the reaction. Unreacted materials were removed by subjecting the reaction mass to distillation under 2 millimeters pressure at a maximum liquid temperature of 179° C. The residue was a viscous, yellow oil weighing 30.8 grams. This represents a 50-percent yield of coupled product. The product contained 9.79 percent phosphorus. It had kinematic viscosities of 119.2 centistokes at 100° F. and of 14.49 centistokes at 210° F., a viscosity index of 122.3, and a pour point of less than −30° F.

REACTIONS OF PHOSPHORUS COMPOUNDS HAVING A P—H LINKAGE AND AN UNSATURATED C—C LINKAGE IN THE SAME MOLECULE

The following example illustrates the reaction between molecules of phosphorus compound reactants having an unsaturated carbon-carbon linkage and a phosphorus-hydrogen linkage in the same molecule. As mentioned hereinbefore, the reaction involved is a type of polymerization reaction.

*Example 72.—Reaction between molecules of diallyl phosphite in the presence of dibenzoyl peroxide*

To 10 grams (0.0617 mole) of diallyl phosphite maintained at 70–80° C., 0.5 gram (0.002 mole) of dibenzoyl peroxide was added, in three portions, during a 5-minute period. After an induction period of about 5 minutes, a vigorous exothermic reaction took place, and the entire reaction mass was solidified. The product was soft, spongy, and clear. Subsequent reactions run more slowly in inert solvents did not afford products which had appreciably altered products. No analyses were made of these products.

The diallyl phosphite used herein boiled at 81° C. vapor temperature under 2.5 millimeters pressure. It contained 19.13 percent phosphorus (theory=19.14 percent). The refractive index thereof was 1.4460 ($n_D^{20}$).

From the foregoing working examples, it will be evident that the present invention provides a wide variety of new compounds containing at least one carbon-phosphorus linkage per molecule. As illustrated therein, these compounds are prepared by reacting a phosphorus compound having at least one carbon-phosphorus linkage per molecule with an organic compound containing at least one unsaturated carbon-carbon linkage per molecule. It will be readily apparent to those skilled in the art that the present invention provides a means for preparing many phosphorus-containing compounds which have been virtually impossible to prepare by methods known heretofore.

The new compositions of matter set forth herein may be represented by the following generic formula

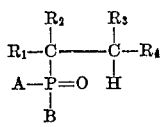

wherein $R_1$ and $R_2$ may be hydrogen atoms, alkyl radicals, carboxy-substituted alkyl radicals, esterified carboxy-substituted alkyl radicals, carbonyldioxy-substituted alkyl radicals, aldo-substituted alkyl radicals, carbonyl-substituted alkyl radicals, or carbinol-substituted alkyl radicals; and $R_3$ and $R_4$ may be hydrogen atoms, alkyl radicals, carboxy-substituted alkyl radicals, esterified carboxy-substituted alkyl radicals, carbonyl-dioxy-substituted alkyl radicals, aldo-substituted alkyl radicals, carbinol-substituted alkyl radicals, polymeric hydrocarbon radicals, or the group

further characterized in that $R_2$ and $R_3$ conjointly may form fragments of a cyclic terpene, acycloalkyl group, or a cyclic dicarboxylic acid anhydride, wherein the group

forms the remaining fragment of the ring, and in that when $R_2$ is a hydrogen atom, $R_1$ is a substituent other than a hydrogen atom.

The products made available by the process involved herein, have many uses. By way of illustration, the neutral alkanephosphonic esters may be utilized as hydraulic fluids, heat transfer media, synthetic lubricating oils, and plasticizers. They also possess extreme pressure lubricant properties and are useful as additives for improving characteristics of mineral lubricating oils. The alkanephosphonic acids are useful as extreme pressure lubricant additives, and as antirust agents. The metal and amine salts thereof are also useful antirust compounds, and oiliness agents for lubricants. These salts possess wetting and detergent properties, those of lower molecular weight being effective in water solutions and those of higher molecular weight being effective in hydrocarbon fractions. Some of the salts are particularly effective as flotation agents in ore beneficiation.

Allyl- and vinyl-phosphonic acids and derivatives thereof are particularly useful polymerization intermediates, since the products and interpolymers formed with other agents tend to be fire-resistant. The alkane-diphosphonic acids are useful in forming new type polymers with di- and poly-amines, and with glycols and other poly-hydroxy compounds. The esters of alkanediphosphonic acids are useful as plasticizers and synthetic lubricants, and for most applications where the monophosphates are ordinarily employed. A wide variety of other uses for the materials of the present invention will become apparent to those skilled in the art.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. An organic phosphorus compound selected from the group consisting of (1) a compound having the formula:

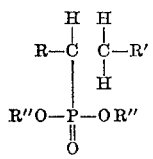

wherein R is a radical selected from the group consisting of —COOH, —COOC$_2$H$_5$, and alkyl radicals having between about 2 and about 8 carbon atoms; R' is a radical selected from the group consisting of —R'''COOH, —R'''OH, —R'''Cl, —COOH, and —COOC$_2$H$_5$, wherein R''' is an alkylene group having between about one carbon atom and about 8 carbon atoms; and R'' is an alkyl radical having between about one carbon atom and about 18 carbon atoms; (2) a compound having the formula:

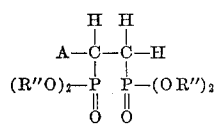

wherein R'' is an alkyl radical having between about 4 carbon atoms and about 18 carbon atoms and A is selected from the group consisting of hydrogen and phenyl; (3) a compound having the formula:

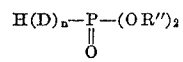

wherein D is a divalent hydrocarbon group

n is an integer of between 2 and 7, inclusive, and R'' is an alkyl radical having between about one carbon atom and about 18 carbon atoms; and (4)

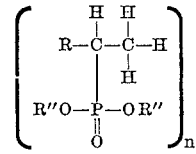

wherein R is an alkyl radical having between about 2 and about 8 carbon atoms, R'' is an alkyl radical having between one carbon atom and about 18 carbon atoms, and n is an integer greater than one.

2. As a new product tetrabutyl 1,2-ethane diphosphonate.

3. (Dibutyl phosphono-) stearic acid.
4. (Dibutyl phosphono-) succinic acid.
5. (Di-2-ethylhexyl phosphono-) succinic acid.
6. (Dibutyl phosphono-) diethyl succinate.
7. (Dibutyl phosphono-) chloropropane.

8. A compound having the formula:

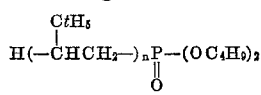

wherein $n$ is an integer of between 2 and 7, inclusive.

9. A process for the production of organic phosphorus compounds having at least one carbon-phosphorus linkage per molecule, which comprises reacting a phosphorus compound having at least one phosphorus-hydrogen linkage per molecule with an acetylenic unsaturated organic compound, at temperatures varying between about 20° C. and about 300° C.

10. A process for the production of organic phosphorus compounds having at least one carbon-phosphorus linkage per molecule, which comprises reacting a phosphorus compound having at least one phosphorus-hydrogen linkage per molecule with an acetylene, at temperatures varying between about 20° C. and about 300° C.

11. A process for the production of organic phosphorus-containing telomers, which comprises reacting a dialkyl phosphite with a molar excess of an unsaturated hydrocarbon, selected from the group consisting of styrene and lower alkyl styrene at temperatures varying between about 20° C. and about 300° C.

References Cited in the file of this patent

UNITED STATES PATENTS

| | | |
|---|---|---|
| 2,478,390 | Hanford et al. | Aug. 9, 1949 |
| 2,492,994 | Harman et al. | Jan. 3, 1950 |
| 2,516,168 | Woodstock | July 25, 1950 |

OTHER REFERENCES

Hergmann et al.: Berichte, vol. 63, pages 1158–1175 (1930), pages 1165 and 1169 only are relied upon.

Ford-Moore et al., J. Chem. Soc. (1947), pages 1465–1467.

UNITED STATES PATENT OFFICE
Certificate of Correction

Patent No. 2,957,931                                      October 25, 1960

Lyle A. Hamilton et al.

It is hereby certified that error appears in the above numbered patent requiring correction and that the said Letters Patent should read as corrected below.

Column 7, in the table, under the heading, "Organic Form", (5b), for "Butylhypophosphite oxide" read —Butylhypophosphite—; same table, (5c), for "Butylhydroxyphosphine" read —Butylhydroxyphosphine oxide—; column 14, line 9, for "tertadecadiene" read —tetradecadiene—; line 34, for "five" read —give—; column 15, line 34, for "reacants" read —reactants—; lines 47 and 48, for "ally oey ether, dially ether, dialyacetal," read —allyl oleyl ether, diallyl ether, diallylacetal,—; column 16, line 23, for "ocurs" read —occurs—; line 41, for "bis-(diamyloxophosphoino-)" read —bis-(diamyloxophosphino-)—; column 18, lines 45 to 48, Equation (15), for the left-hand portion reading

column 19, line 70, for "bis-(cyclopentylhydroxyoxosphino-) dibromoethane" read —bis-(cyclopentylhydroxyoxophosphino-) dibromoethane—; column 22, lines 24 to 28, Equation (29), the left-hand portion of the equation should appear as shown below instead of as in the patent:

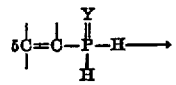

line 36, for "allyphosphine oxide" read —allylphosphine oxide—; same column 22, line 38, for "octadencylhydroxyphosphine oxide" read —octadecenylhydroxyphosphine oxide—; line 75, for "sypes" read —types—; column 27, line 74, for ".05" read —0.5—; column 36, line 53, in the table, last column thereof, under the heading, "Neutralization Number", for "13" read —213—; column 39, line 22, for "adduct 7.34" read —adduct= 7.34—; column 41, lines 11 to 13, the right-hand portion of the equation should appear as shown below instead of as in the patent:

column 43, line 56, after "benzoyl" insert —peroxide—; column 48, line 25, for "washed off" read —washed free—; column 49, line 16, for "miximum" read —maximum—; column 57, line 2, claim 8, for that portion of the formula reading "$C_tH_b$" read —$C_6H_5$—.

Signed and sealed this 6th day of June 1961.

[SEAL]

Attest:
ERNEST W. SWIDER,                                              DAVID L. LADD,
*Attesting Officer.*                                                     *Commissioner of Patents.*